(12) United States Patent
Schultz

(10) Patent No.: US 10,059,048 B2
(45) Date of Patent: Aug. 28, 2018

(54) FLOW OF HYDRAULIC FLUID FROM ACCUMULATOR ASSEMBLY AND FROM PUMP ASSEMBLY TO ACTUATOR WHERE HIGHER FLOW IS REQUIRED

(71) Applicant: Husky Injection Molding Systems Ltd., Bolton (CA)

(72) Inventor: Gregory Allan Schultz, Bolton (CA)

(73) Assignee: HUSKY INJECTION MOLDING SYSTEMS LTD., Bolton, Ontario (CA)

( * ) Notice: Subject to any disclaimer, the term of this patent is extended or adjusted under 35 U.S.C. 154(b) by 671 days.

(21) Appl. No.: 14/371,611

(22) PCT Filed: Feb. 6, 2013

(86) PCT No.: PCT/CA2013/050089
§ 371 (c)(1),
(2) Date: Jul. 10, 2014

(87) PCT Pub. No.: WO2013/120194
PCT Pub. Date: Aug. 22, 2013

(65) Prior Publication Data
US 2015/0037448 A1      Feb. 5, 2015

Related U.S. Application Data

(60) Provisional application No. 61/598,030, filed on Feb. 13, 2012.

(51) Int. Cl.
*B29C 45/82* (2006.01)
*B29C 45/76* (2006.01)

(52) U.S. Cl.
CPC .............. *B29C 45/82* (2013.01); *B29C 45/76* (2013.01); *B29C 45/7626* (2013.01);
(Continued)

(58) Field of Classification Search
None
See application file for complete search history.

(56) References Cited

U.S. PATENT DOCUMENTS

| | | | |
|---|---|---|---|
| 4,712,991 A | 12/1987 | Hehl | |
| 5,052,909 A * | 10/1991 | Hertzer | B29C 45/82 |
| | | | 425/150 |

(Continued)

FOREIGN PATENT DOCUMENTS

| | | |
|---|---|---|
| EP | 1762361 A1 | 3/2007 |
| JP | 5933130 A | 2/1984 |

(Continued)

OTHER PUBLICATIONS

PCT International Search Report; Cuerrier, Pierre; 3 pages; Feb. 22, 2013.

(Continued)

*Primary Examiner* — Jacob T Minskey

(57) ABSTRACT

A memory assembly (800), comprising: a storage media (802) tangibly embodying executable commands configured to direct a molding-system controller (114) to send a command signal to the first accumulator-control valve (106) and the first actuator control valve (110), the command signal configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112) for the case where the molding-system controller (114) determines that the first actuator assembly (112) requires the flow from both the first pump assembly (104) and the first accumulator assembly (108) during a portion of a molding cycle.

9 Claims, 10 Drawing Sheets

(52) U.S. Cl.
CPC .... *B29C 45/7653* (2013.01); *B29C 2045/824* (2013.01); *B29C 2945/76859* (2013.01); *B29C 2945/76869* (2013.01); *B29C 2945/76896* (2013.01)

(56) References Cited

U.S. PATENT DOCUMENTS

| | | | |
|---|---|---|---|
| 5,580,585 | A | 12/1996 | Holzschuh |
| 6,275,741 | B1 * | 8/2001 | Choi ................. B29C 45/76 700/10 |
| 6,379,119 | B1 | 4/2002 | Truninger |
| 6,527,540 | B1 | 3/2003 | Dantlgraber |
| 6,868,305 | B2 | 3/2005 | Choi |
| 7,067,078 | B2 | 6/2006 | Amano |
| 7,176,648 | B2 | 2/2007 | Choi |
| 2003/0090019 | A1 | 3/2003 | Amano |
| 2006/0070378 | A1 | 4/2006 | Geiger |
| 2007/0235892 | A1 | 10/2007 | Zander et al. |

FOREIGN PATENT DOCUMENTS

| | | |
|---|---|---|
| JP | 2009226449 A | 10/2009 |
| WO | 2011075812 A1 | 6/2011 |

OTHER PUBLICATIONS

European Search Report, Gemeinböck Gerald, Oct. 1, 2015, 7 pages.

* cited by examiner

FLOW OF HYDRAULIC FLUID FROM ACCUMULATOR ASSEMBLY AND FROM PUMP ASSEMBLY TO ACTUATOR WHERE HIGHER FLOW IS REQUIRED

TECHNICAL FIELD

Aspects generally relate to (and not limited to) mold-tool systems including (and not limited to) molding systems.

BACKGROUND

U.S. Pat. No. 4,712,991 (HEHL) discloses a hydraulic control system for injection unit of injection molding machine.

U.S. Pat. No. 5,052,909 (HERTZER et al.) discloses an energy-conserving injection molding machine.

U.S. Pat. No. 5,580,585 (HOLZSCHUH) discloses a hydraulic operational system for an injection molding machine.

U.S. Pat. No. 6,379,119 (TRUNINGER) discloses a hybrid electric and hydraulic actuation system.

U.S. Pat. No. 6,527,540 (DANTLGRABER) discloses a hydrostatic drive system for an injection molding machine and a method for operating such a drive system.

U.S. Pat. No. 6,868,305 (CHOI) discloses an intelligent hydraulic manifold used in an injection molding machine.

U.S. Pat. No. 7,067,078 (AMANO) discloses an injection molding machine having an accumulator and a control method for the injection molding machine.

US 20030090019 (AMANO) discloses an injection molding machine having an accumulator and a control method for the injection molding machine.

SUMMARY

The inventor has researched a problem associated with known molding systems. After much study, the inventor believes he has arrived at an understanding of the problem and its solution, which are stated below.

Known hydraulic circuits use pumps to drive hydraulic actuators. The pump is used to convey hydraulic fluid to the hydraulic actuator. A motor is used to actuate the pump. The rotational speed of the pump (or displacement of the pump) may be changed to match with the requirements of the hydraulic actuator. For higher flow and higher power requirements, the known control of the hydraulic actuator is less than optimal because the control method may require multiple pumps and multiple motors. There are limits also on the size of the pumps and motors because the inertia of these assemblies may become too high and thereby may restrict the dynamic operation of the molding system. Known solutions for higher flow and higher power of hydraulic fluid may use accumulators, which are continuously supplied with hydraulic fluids from the pump, or pumps, at a fixed pressure level. The control of speed and pressure in the hydraulic actuator may be done by a proportional valve. Restricting the hydraulic fluid by the proportional valve provides improved control but may be wasteful of energy when compared to a pump-based control approach. Most molding systems have a requirement for multiple hydraulic actuators, in which some hydraulic actuators need higher flow of hydraulic fluid at a varying pressure, while other actuators need lower flow at a varying pressure. To maintain the existing level of performance while obtaining energy savings similar to a pump-based system, there is provided the following solutions to be described below.

In order to resolve, at least in part, the above-noted issues, according to a first aspect, there is provided a memory assembly (800), comprising: a storage media (802) tangibly embodying executable commands configured to direct a molding-system controller (114) to send a command signal to the first accumulator-control valve (106) and the first actuator control valve (110), the command signal configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112) for the case where the molding-system controller (114) determines that the first actuator assembly (112) requires the flow from both the first pump assembly (104) and the first accumulator assembly (108) during a portion of a molding cycle.

In order to resolve, at least in part, the above-noted issues, according to a second aspect, there is provided a molding system (900), comprising: a first hydraulic circuit (100), including: a reservoir (102), a first pump assembly (104), a first accumulator-control valve (106), a first accumulator assembly (108), a first actuator control valve (110), a first actuator assembly (112), and a molding-system controller (114), the first pump assembly (104) is operatively connected to the reservoir (102), the first accumulator-control valve (106) is operatively connected to first pump assembly (104), the first accumulator assembly (108) is operatively connected to first accumulator-control valve (106), the first actuator control valve (110) is operatively connected to first pump assembly (104), the first actuator assembly (112) is operatively connected to first actuator control valve (110), the molding-system controller (114) is operatively connected to first accumulator-control valve (106) and first actuator control valve (110), the molding-system controller (114) is configured to send a command signal to the first accumulator-control valve (106) and the first actuator control valve (110), the command signal is configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112), for the case where the molding-system controller (114) determines that the first actuator assembly (112) requires the flow from both the first pump assembly (104) and the first accumulator assembly (108) during a portion of a molding cycle.

In order to resolve, at least in part, the above-noted issues, according to a third aspect, there is provided a molding system (900), comprising: a molding-system controller (114) operatively connected to a first accumulator-control valve (106) and to a first actuator control valve (110), the molding-system controller (114) configured to send a command signal to the first accumulator-control valve (106) and the first actuator control valve (110), wherein, the command signal is configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112), for the case where the molding-system controller (114) determines that the first actuator assembly (112) requires the flow from both the first pump assembly (104) and the first accumulator assembly (108) during a portion of a molding cycle of the molding system (900).

In order to resolve, at least in part, the above-noted issues, according to a fourth aspect, there is provided a method of operating a molding-system controller (114), the method comprising: configuring the molding-system controller (114) to send a command signal to the first accumulator-control valve (106) and the first actuator control valve (110), wherein the command signal is configured to request: (i) the first accumulator-control valve (106) to permit flow of hydraulic fluid from a first accumulator assembly (108) to a first actuator assembly (112), and (ii) the first actuator control valve (110) to permit flow of hydraulic fluid from a first pump assembly (104) to the first actuator assembly (112), for a case where the molding-system controller (114) determines that the first actuator assembly (112) requires the flow from both the first pump assembly (104) and the first accumulator assembly (108) during a portion of a molding cycle of the molding system (900).

Other aspects for resolving the above-noted issues are identified in the claims.

Other aspects and features of the non-limiting embodiments may now become apparent to those skilled in the art upon review of the following detailed description of the non-limiting embodiments with the accompanying drawings.

DETAILED DESCRIPTION OF THE DRAWINGS

The non-limiting embodiments may be more fully appreciated by reference to the following detailed description of the non-limiting embodiments when taken in conjunction with the accompanying drawings, in which.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE NON-LIMITING EMBODIMENT(S)

It may be appreciated that for the purposes of this document, the phrase "includes (and is not limited to)" is equivalent to the word "comprising." The word "comprising" is a transitional phrase or word that links the preamble of a patent claim to the specific elements set forth in the claim that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim.

Figure 1A:
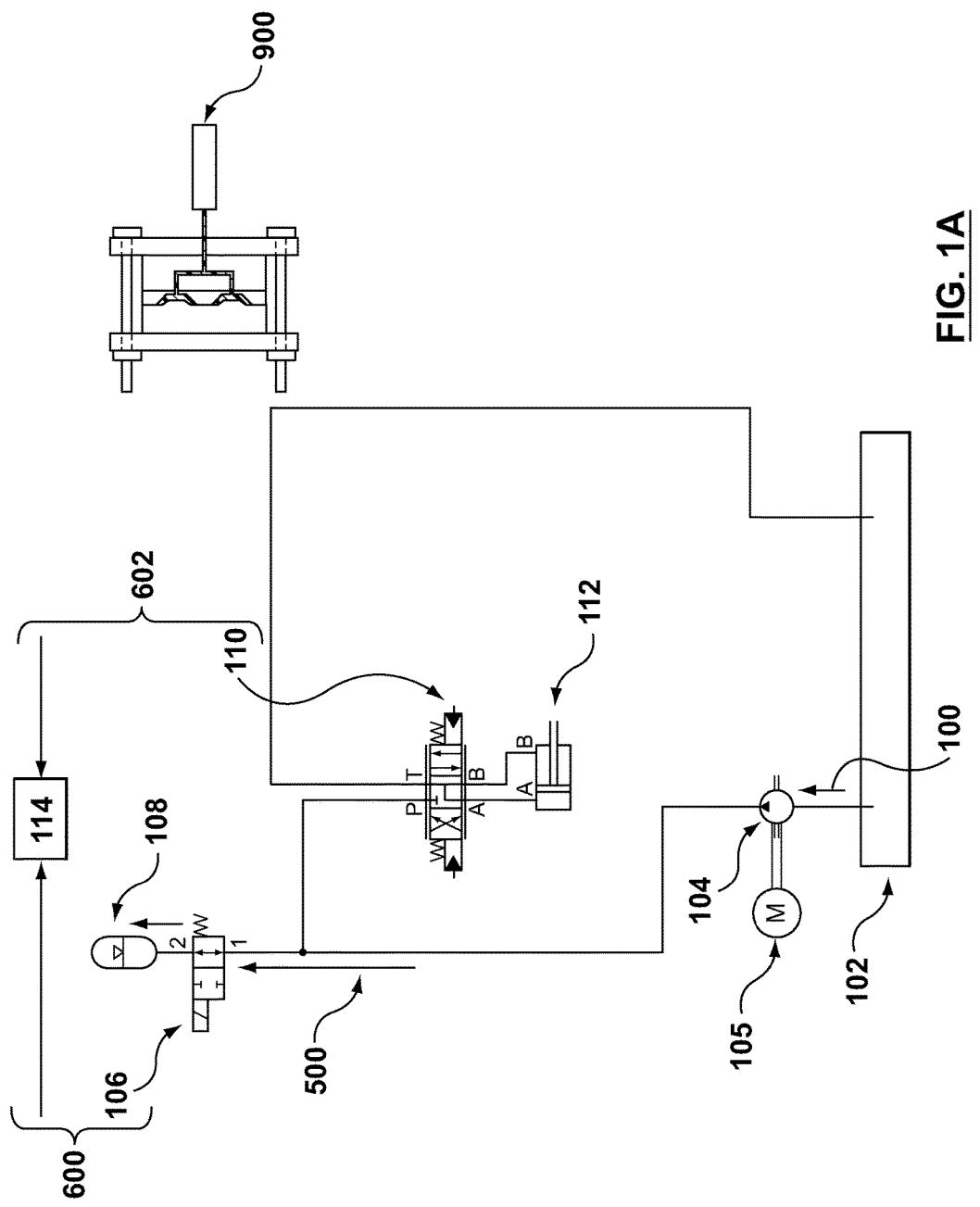
FIG. 1A depicts a first example of a first hydraulic circuit (100) under a first operation mode.

Referring now to FIGS. 1A and. 1B, there is depicted the molding system (900) configured to mold articles. An example of the molding system (900) is depicted in FIG. 4, in which the molding system (900) is configured to support and to use the first hydraulic circuit (100) of any one of FIGS. 1A, 1B, 2A, 3A. According to the example depicted in FIGS. 1A and 1B, the molding system (900) including (and is not limited to) the first hydraulic circuit (100). The first hydraulic circuit (100) is configured to actuate a function. The first hydraulic circuit (100) is configured to actuate a function (at least one or more functions) of the molding system (900). According to the example depicted in FIGS. 1A and 1B, the first hydraulic circuit (100) including (and is not limited to): a reservoir (102), a first pump assembly (104), a first motor assembly (105), a first accumulator-control valve (106), a first accumulator assembly (108), a first actuator control valve (110), a first actuator assembly (112), and a molding-system controller (114). The reservoir (102) is configured to be a source of hydraulic fluid. The first pump assembly (104) is operatively connected to the reservoir (102). The first pump assembly (104) is configured to pump hydraulic fluid from reservoir (102) to: (a) first accumulator-control valve (106), and (b) first actuator control valve (110). The first pump assembly (104) is operatively connected to the molding-system controller (114). The first pump assembly (104) is configured to be controlled by the molding-system controller (114). The molding-system controller (114) is configured to control the first pump assembly (104) by changing rpm or displacement or both associated with the first pump assembly (104). The first motor assembly (105) is operatively connected to the first pump assembly (104). The first motor assembly (105) is configured to actuate movement of the first pump assembly (104). The first motor assembly (105) is operatively connected to the molding-system controller (114). The first motor assembly (105) is configured to be controlled by the molding-system controller (114). By way of example, the first motor assembly (105) including (and is not limited to) an AC synchronous motor. The first accumulator-control valve (106) is operatively connected to first pump assembly (104). The first accumulator-control valve (106) is configured to be controlled by the molding-system controller (114). The first accumulator-control valve (106) is configured to: (a) permit flow of hydraulic fluid to the first accumulator assembly (108), and (b) shut off the flow of hydraulic fluid to first accumulator assembly (108). The first accumulator assembly (108) is operatively connected to first accumulator-control valve (106). The first accumulator assembly (108) is configured to: (a) receive hydraulic fluid from first accumulator-control valve (106), and (b) build up pressure of hydraulic fluid to a pre-charge pressure within the first accumulator assembly (108). The first actuator control valve (110) is operatively connected to the first pump assembly (104). The first actuator control valve (110) is configured to permit flow of hydraulic fluid from the first pump assembly (104) to first actuator assembly (112) without receiving flow of supplementary hydraulic fluid from the first accumulator assembly (108) via the first accumulator-control valve (106), so that the first actuator assembly (112) operates to provide a function along an axis of the molding system (900) for the case where the first pump assembly (104) is capable of satisfying the flow requirements of the first actuator assembly (112). As well, the first actuator control valve (110) is configured to permit flow of hydraulic fluid from the first pump assembly (104) and flow of supplementary hydraulic fluid from the first accumulator assembly (108) to first actuator assembly (112) via the first accumulator-control valve (106), so that the first actuator assembly (112) operates to provide a function along an axis of the molding system (900) for the case where the combination of the first pump assembly (104) and the first accumulator assembly (108) is capable of satisfying the flow requirements of the first actuator assembly (112). As well, the first actuator control valve (110) is configured to shut off the flow of hydraulic fluid to the first actuator assembly (112) for the case where the first actuator assembly (112) is no longer required to operate. As well, the first actuator control valve (110) is configured to permit the flow of hydraulic fluid from first actuator assembly (112) to reservoir (102) for the case where first actuator assembly (112) has excess hydraulic fluid. As well, the first actuator control valve (110) is configured to shut off the flow of hydraulic fluid from first actuator assembly (112) to reservoir (102) for the case where first actuator assembly (112) does not have excess hydraulic fluid. The first actuator assembly (112) is operatively connected to first actuator control valve (110). The first actuator assembly (112) is configured to impart a force along a first axis of molding system (900). The molding-system controller (114) is operatively connected to first accumulator-control valve (106) and to the first actuator control valve (110). The molding-system controller (114) is configured to control operation of first accumulator-control valve (106) and first actuator control valve (110). The molding-system controller (114) is configured to control operation of the first accumulator-control valve (106) and to control operation of the first actuator control valve (110) such that the first pump assembly (104) and the first accumulator assembly (108) provide an hydraulic fluid to the first actuator assembly (112) during a portion of a molding cycle of the molding system (900). The molding-system controller (114) is configured to send a command signal to the first accumulator-control valve (106) and to the first actuator control valve (110). The command signal sent by the molding-system controller (114) requests the first accumulator-control valve (106) to permit flow of hydraulic fluid from the first accumulator assembly (108) to the first actuator assembly (112), and as well, the command signal sent by the molding-system controller (114) requests: the first actuator control valve (110) to permit flow of hydraulic fluid from the first pump assembly (104) to the first actuator assembly (112), for the case where the molding-system controller (114) determines that the first actuator assembly (112) requires the flow from both the first pump assembly (104) and the first accumulator assembly (108) during a portion of a molding cycle of the molding system (900).

By way of example, the molding-system controller (114) may determine that the first actuator assembly (112) requires the flow from both the first pump assembly (104) and the first accumulator assembly (108) during a portion of a molding cycle of the molding system (900) in the following way: the molding-system controller (114) is configured to make this determination by the speed of the first actuator assembly (112) or by a pressure measurement of the hydraulic fluid in the first hydraulic circuit (100). If the speed of the first actuator assembly (112) is too low and the flow of hydraulic fluid from the first pump assembly (104) is at the maximum, then the molding-system controller (114) will request that the first accumulator assembly (108) is engaged to supplement with supplemental hydraulic fluid. The molding-system controller (114) may be programmed so that if the speed of the first actuator assembly (112) is higher than the output of the first pump assembly (104), then the first accumulator-control valve (106) is opened to permit supplemental flow of hydraulic fluid from the first accumulator assembly (108) as may be required. For the case where the speed setting for the first actuator assembly (112) is lower than the capacity of the first actuator assembly (112), then the first accumulator assembly (108) stays closed—that is, no flow of hydraulic fluid from the first accumulator assembly (108) is required. Cylinder sizes of the first actuator assembly (112), and any other factors, may need to be programmed into the molding-system controller (114). Hydraulic flow may be calculated by the area of first actuator assembly (112) times the velocity of the first actuator assembly (112). For the case where pressure is too low in the first actuator assembly (112), then the accumulator may be isolated so that full pressure is directed to the first actuator assembly (112), or the first accumulator assembly (108) may supplement with supplementary hydraulic fluid. This may be dependent on actual pressure in the first accumulator assembly (108) measured by a pressure transducer (not depicted and known). Also, the pressure level of the first accumulator assembly (108) may be determined by measuring the pressure and velocity in the first actuator assembly (112). For the case where the required pressure is low but hydraulic flow is higher than the output of the first pump assembly (104), then the first accumulator assembly (108) may be charged to a level appropriate to supply hydraulic flow but not waste energy by overcharging the first accumulator assembly (108). For the case where pressure is known to be high based on set-points associated with the molding system (900), such as maximum tonnage or maximum injection capacity, then the first accumulator assembly (108) may be charged to the elevated level before hand.

The molding-system controller (114) is configured to control the pump to achieve optimum energy savings when oil demand is within the capacity of the first pump. For the case where there is a requirement or demand for higher flow of hydraulic fluid, the first accumulator assembly (108) is connected or enabled, via the first accumulator-control valve (106), so that the first accumulator assembly (108) provides a supplementary supply of hydraulic fluid to the first actuator assembly (112). According to an option, the first accumulator-control valve (106) may be proportionally controlled, can be turned off and on, at appropriate time(s) in the molding cycle of the molding system (900) to charge the first accumulator assembly (108) or to supply supplementary flow of hydraulic fluid to the first actuator assembly (112). The molding-system controller (114) is configured to control operation of the first accumulator-control valve (106). For the case where the molding-system controller (114) operates the first accumulator-control valve (106), the first accumulator-control valve (106) operates to: permit flow of hydraulic fluid to the first accumulator assembly (108) for the case where the controller has sent a command signal to the first actuator control valve (110). The command signal is configured to request the first actuator control valve (110) to shut off flow of hydraulic fluid to the first actuator assembly (112). For the case where the molding-system controller (114) operates the first accumulator-control valve (106), the first accumulator-control valve (106) operates to: shut off the flow of hydraulic fluid to first accumulator assembly (108) for the case where the molding-system controller (114) receives a pressure signal from a pressure sensor indicating that the hydraulic fluid in the first accumulator assembly (108) has reached an amount of hydraulic pressure, and the pressure sensor is coupled to the first accumulator assembly (108); for example, the pressure signal is compared to a threshold level in order to determine whether the amount of hydraulic pressure has been reached. For the case where the molding-system controller (114) operates the first accumulator-control valve (106), the first accumulator-control valve (106) operates to: shut off flow of hydraulic fluid to the first accumulator assembly (108) for the case where the controller has sent a command signal to the first actuator control valve (110). The command signal is configured to request the first actuator control valve (110) to permit flow of hydraulic fluid to the first actuator assembly (112). For the case where the molding-system controller (114) operates the first accumulator-control valve (106), the first accumulator-control valve (106) operates to: permit flow of hydraulic fluid from the first accumulator assembly (108) to the first actuator assembly (112) for the case where: (A) the molding-system controller (114) has sent a command signal to the first actuator control valve (110). The command signal is configured to request the first actuator control valve (110) to permit flow of hydraulic fluid to the first actuator assembly (112), and (B) the molding-system controller (114) has determined the first pump assembly (104) cannot provide the amount of flow required by the first actuator assembly (112), thus the first accumulator assembly (108) provides a supplemental flow of hydraulic fluid to the first actuator assembly (112).

A technical advantage of "such that the pump and the accumulator provide the hydraulic fluid to the first actuator assembly (112) during a portion of a molding cycle of the molding system (900)" is a reduction, at least in part, in energy consumption since the pump may be sized somewhat smaller since the first accumulator assembly (108) may be relied upon for supplementary hydraulic fluid, from time to time, as may be required.

There is provided an option, from amongst others options, that provides a solution to the problem, which is a molding system (900). The molding system (900) including (and is not limited to): a first hydraulic circuit (100), including (and is not limited to): (a) a reservoir (102), (b) a first pump assembly (104), (c) a first accumulator-control valve (106), (d) a first accumulator assembly (108), (e) a first actuator control valve (110), (f) a first actuator assembly (112), and (g) a molding-system controller (114). The first pump assembly (104) is operatively connected to the reservoir (102). The first accumulator-control valve (106) is operatively connected to first pump assembly (104). The first accumulator assembly (108) is operatively connected to first accumulator-control valve (106). The first actuator control valve (110) is operatively connected to first pump assembly (104). The first actuator assembly (112) is operatively connected to first actuator control valve (110). The molding-system controller (114) is operatively connected to first accumulator-control valve (106) and first actuator control valve (110). The molding-system controller (114) is configured to send a command signal to the first accumulator-control valve (106) and the first actuator control valve (110). The command signal is configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112), for the case where the molding-system controller (114) determines that the first actuator assembly (112) requires the flow from both the first pump assembly (104) and the first accumulator assembly (108) during a portion of a molding cycle of the molding system (900).

In the first hydraulic circuit (100), the first pump assembly (104) may be controlled by changing rotational speed of the first pump assembly (104) or the displacement of the first pump assembly (104), or speed and displacement, to achieve, at least in part, some energy savings for the case where the demand for hydraulic fluid is within the capacity of the first pump assembly (104). For the case where there is a requirement for a higher flow of hydraulic fluid, the first accumulator assembly (108) may be enabled, via the first accumulator-control valve (106), so that the first accumulator assembly (108) provides a supplementary supply or flow of hydraulic fluid. The first accumulator-control valve (106) may be proportionally controlled, and may be turned off and on, at appropriate times in the cycle of the molding system (900) in order to charge the first accumulator assembly (108) or supply the supplementary hydraulic fluid to the first actuator assembly (112) along with hydraulic flow from the first pump assembly (104).

The first accumulator assembly (108) is configured to: (a) provide a higher flow of hydraulic fluid as may be required, and (b) remain isolated (or in standby mode) while the pump provides all of the flow of hydraulic fluid (that is, allow for pump-based actuator control). Without the first accumulator-control valve (106), the flow of hydraulic fluid from the first pump assembly (104) may follow the path of least resistance, and thus the flow from the first pump assembly (104) may be going to the first accumulator assembly (108) when the flow of hydraulic fluid may be actually required to go to the first actuator assembly (112) instead.

Figure 3A:
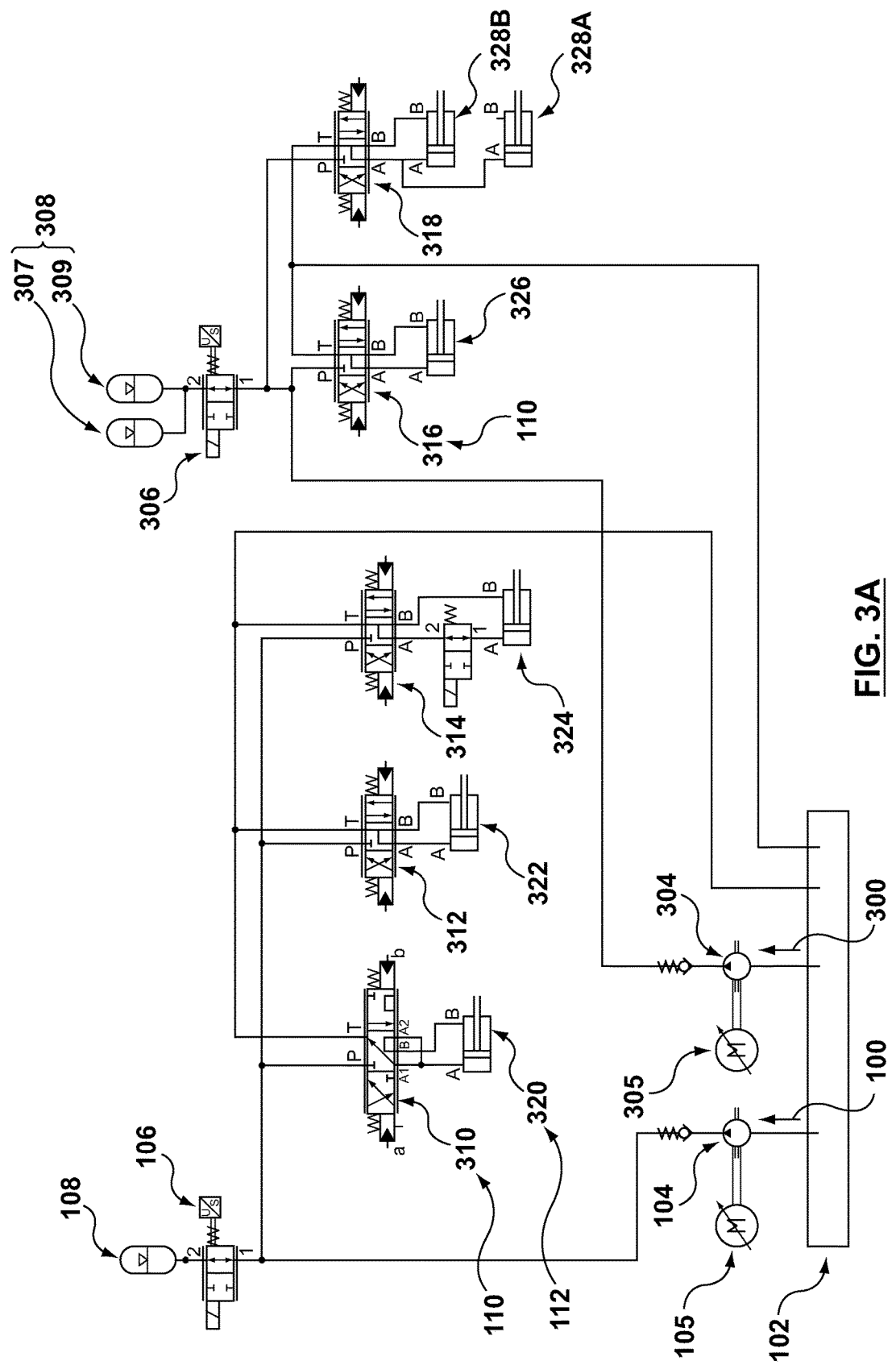
FIG. 3A depicts a third example of the first hydraulic circuit (100) of FIGS. 1A, 1B.
Figure 4:
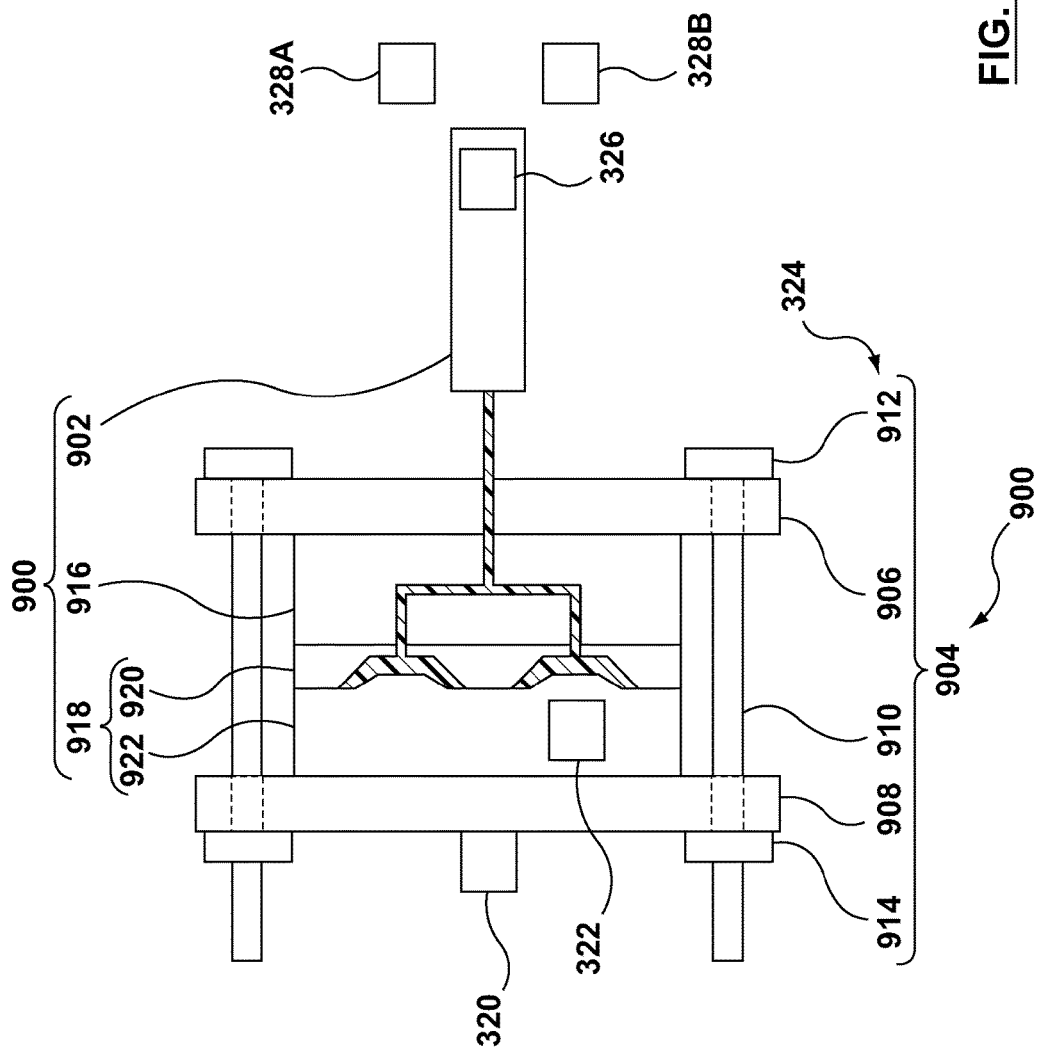
FIG. 4 depicts an example of the molding system (900) configured to support and to use the first hydraulic circuit (100) of any one of FIGS. 1A, 1B, 2A, 3A, and/or the second hydraulic circuit (302) of FIG. 3A.

The first accumulator assembly (108) may be split into dedicated regions of the molding system (900) that they supply hydraulic fluid to actuators, such as (for example) the clamp-up actuator or the injection actuator, which is depicted in FIG. 3A.

By using the molding-system controller (114), the first accumulator assembly (108) may be filled to an optimum pressure level depending on the molding cycle of the molding system (900). Filling the first accumulator assembly (108) to an optimum level with hydraulic fluid may further improve energy efficiency because less energy in the pressurized hydraulic is converted to heat in order to limit the motion of the first actuator assembly (112). The molding-system controller (114) is configured to: (a) learn what pressures are required at any given time in a molding cycle of the molding system (900), and (b) have the pump build pressure in a feed forward type of control.

It will be appreciated that variants of the above description may include multiple accumulator assemblies, multiple hydraulic circuits, multiple controllers, multiple feedback devices that feed back information to the molding-system controller (114), fixed displacement pumps or variable displacement pumps, variable speed pump motor or fixed displacement pump motor, proportional control valves or non proportional, no actuator valves, combined with electric or pneumatic driven axis.

The first pump assembly (104) can control axis movement on its own or combined with a secondary (supplementary) supply of hydraulic fluid from the first accumulator assembly (108). The first accumulator assembly (108) may be isolated by means of a valve. The first accumulator assembly (108) may be charged to different levels throughout the cycle of the molding system (900). The outlet flow from the first accumulator assembly (108) may be controlled from the first accumulator-control valve (106) or by the level to which the accumulator is charged. As an option, feed forward control may be used to pressurize the first accumulator assembly (108) to process requirements of the molding system (900).

As an option, the molding-system controller (114) may be configured to learn values and make adjustments on the fly.

Referring now to FIG. 1A, according to another option, the molding-system controller (114) including (and is not limited to): (i) a first permitting means (600), and (ii) the second permitting means (602). The first permitting means (600) is configured to permit flow of hydraulic fluid from a first accumulator assembly (108) to a first actuator assembly (112). The second permitting means (602) is configured to permitting flow of hydraulic fluid from a first pump assembly (104) to the first actuator assembly (112), for a case where the molding-system controller (114) determines that the first actuator assembly (112) requires the flow from both the first pump assembly (104) and the first accumulator assembly (108) during a portion of a molding cycle. By way of example (with reference to FIG. 1), the first permitting means (600) may include: the molding-system controller (114) in combination with the first accumulator-control valve (106). By way of example, the second permitting means (602) may include: the molding-system controller (114) in combination with the first actuator control valve (110).

Figure 1B:
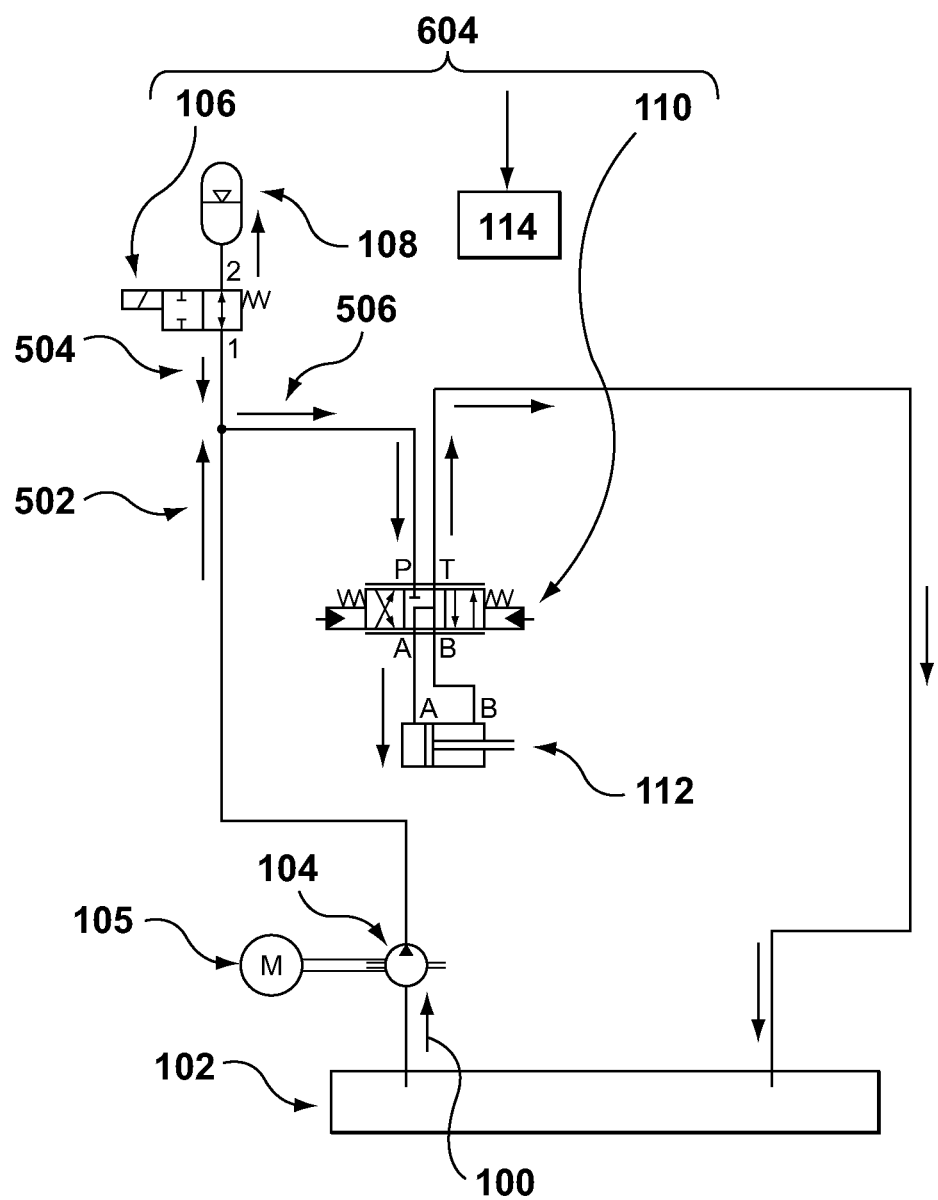
FIG. 1B depicts the first example of the first hydraulic circuit (100) under a second operation mode.

Referring now to FIG. 1B, according to an option, the molding-system controller (114) including (and is not limited to) means (604) for permitting flow of hydraulic fluid from: (i) a first accumulator assembly (108) to a first actuator assembly (112), and (ii) a first pump assembly (104) to the first actuator assembly (112), for a case where the molding-system controller (114) determines that the first actuator assembly (112) requires the flow from both the first pump assembly (104) and the first accumulator assembly (108) during a portion of a molding cycle. By way of example, the means (604) may include: the molding-system controller (114) in combination with the first accumulator-control valve (106) and the first actuator control valve (110).

Figure 1C:
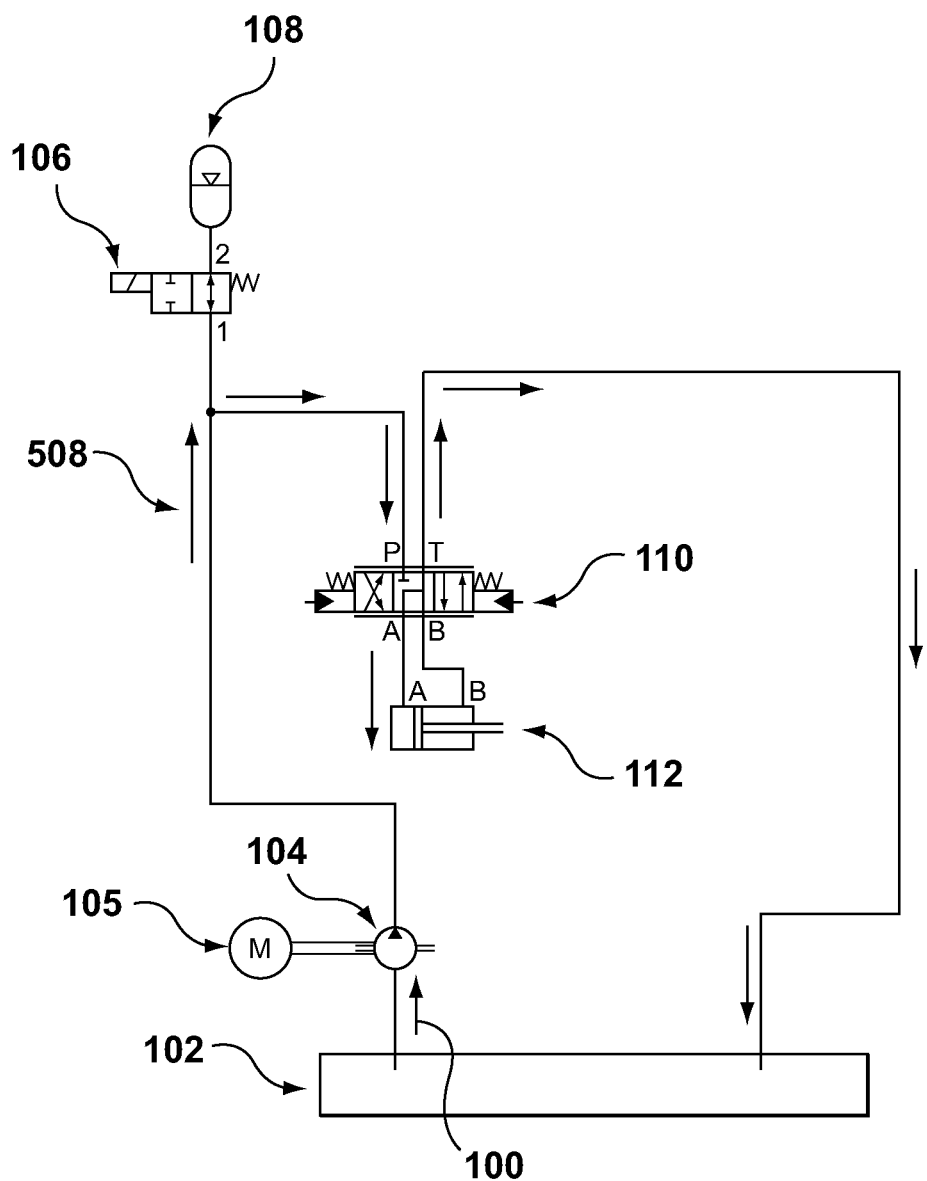
FIG. 1C depicts the first example of the first hydraulic circuit (100) under a third operation mode.

Referring now to FIG. 1C, there is depicted the first example of the first hydraulic circuit (100) under the third operation mode. In the third operation mode, the molding-system controller (114) makes a determination that the flow from the first pump assembly (104) is sufficient to satisfy the requirements of the first actuator assembly (112). The molding-system controller (114) sends a request to the first accumulator-control valve (106) to shut off the flow of hydraulic fluid from the first accumulator assembly (108) to the first actuator control valve (110). As well, the molding-system controller (114) sends a request to the first actuator control valve (110) to permit the flow of hydraulic fluid from the first pump assembly (104) to the first actuator assembly (112). In the third operation mode, the first pump assembly (104) supplies the flow of hydraulic fluid on its own to the first actuator assembly (112) without assistance from the first accumulator assembly (108)—that is, without supplemental flow of hydraulic fluid from the first accumulator assembly (108) to the first actuator assembly (112). It is understood that the first pump assembly (104) may supply the flow of hydraulic fluid initially, and (if so required) then followed by supplemental flow of hydraulic fluid from the first accumulator assembly (108), as may be required.

With reference to the first operation mode as depicted in FIG. 1A, a flow (500) of hydraulic fluid is depicted flowing from the first pump assembly (104) to the first accumulator assembly (108), while there is no flow of hydraulic fluid to the first actuator assembly (112). In this mode of operation, the first actuator assembly (112) does not require a flow of hydraulic fluid. The molding-system controller (114) sends a control signal to the first accumulator-control valve (106) to turn on and permit flow of hydraulic fluid toward the first accumulator assembly (108). The molding-system controller (114) sends a control signal to the first actuator control valve (110) to turn off and not permit the flow of hydraulic fluid toward the first actuator assembly (112).

With reference to the second operation mode, as depicted in FIG. 1A, a flow (502) of hydraulic fluid flows from the first pump assembly (104) to the first actuator assembly (112). A flow (504) of hydraulic fluid (this is the supplemental flow of hydraulic fluid) flows from the first accumulator assembly (108) to the first actuator assembly (112). A flow (506) of hydraulic fluid flows to the first actuator assembly (112). The flow (506) is the sum of the flow (502) and the flow (504). In this mode of operation, the first actuator assembly (112) requires the flow (506) of hydraulic fluid from both the first accumulator assembly (108) and from the first pump assembly (104). The molding-system controller (114) sends a control signal to both the first accumulator-control valve (106) and the first actuator control valve (110) to turn on and permit flow of hydraulic fluid toward the first actuator assembly (112).

With reference to the third operation mode as depicted in FIG. 1C, a flow (508) of hydraulic fluid is depicted flowing from the first pump assembly (104) to the first actuator assembly (112), while there is no flow of hydraulic fluid from the first accumulator assembly (108) to the first actuator assembly (112). In this mode of operation, the first accumulator assembly (108) is not required to provide the supplemental flow of hydraulic fluid to the first actuator assembly (112). The molding-system controller (114) sends a control signal to the first actuator control valve (110) to turn on and permit flow of hydraulic fluid toward the first actuator assembly (112) from the first pump assembly (104). The molding-system controller (114) sends a control signal to the first accumulator-control valve (106) to turn off and not permit the flow of hydraulic fluid toward the first accumulator assembly (108).

According to an option, the molding-system controller (114) is configured to (such as be programmed) vary the hydraulic pressure in the first accumulator assembly (108) during or within the molding cycle for the case where the first actuator assembly (112) is not operating, then the first accumulator assembly (108) is recharged. In this manner, the required performance may be obtained yet not while overcharging the first accumulator assembly (108) and be wasteful of energy.

Figure 1D:
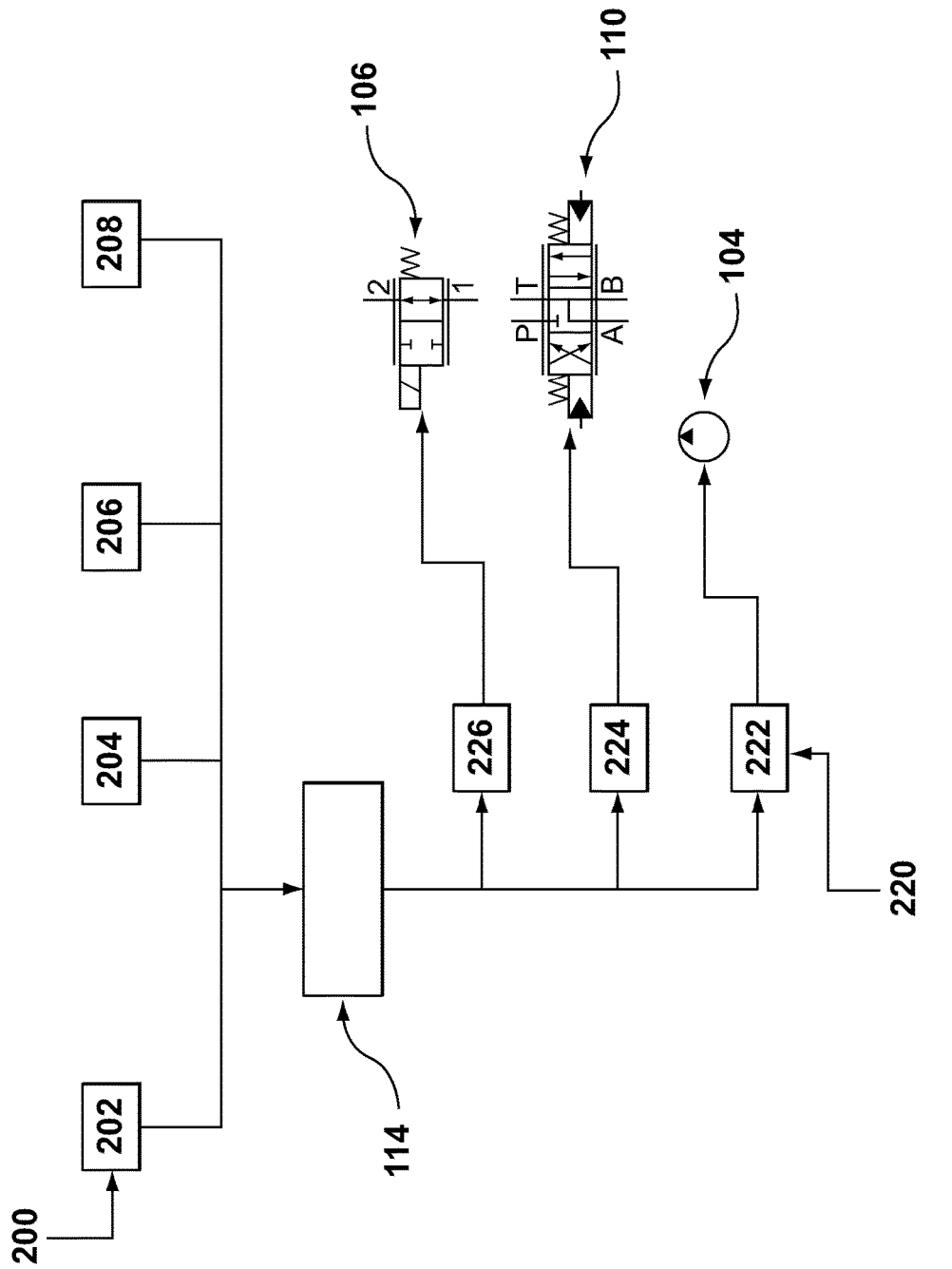
FIG. 1D depicts the first example of the molding-system controller (114) used for controlling operation of the first hydraulic circuit (100) of FIGS. 1A and 1B.

Referring now to FIG. 1D, there is depicted a first example of the molding-system controller (114) used for controlling operation of the first hydraulic circuit (100) of FIGS. 1A and 1B. According to the example depicted in FIG. 1D, the molding-system controller (114) is configured to receive inputs (200). The molding-system controller (114) including (and is not limited to) interface circuits configured to receive the inputs (200), and condition the inputs (200) for use by the molding-system controller (114). The inputs (200) include a first input signal (202). The first input signal (202) is configured to indicate an amount of hydraulic flow from the first pump assembly (104). The hydraulic flow may be calculated from a sensed amount of rotational speed of the first pump assembly (104), or from a sensed amount of displacement associated with the first pump assembly (104).

Appropriate sensors (not depicted but known) may be used for sensing rotational speed of the first pump assembly (104), or for sensing displacement associated with the first pump assembly (104). The inputs (200) include a second input signal (204). The second input signal (204) is configured to indicate an amount of pressure in the first accumulator assembly (108), and is configured to indicate an amount of pressure in the first actuator control valve (110). A pressure sensor (not depicted and known) is configured to sense an amount of pressure in the first accumulator assembly (108). The pressure sensor may be positioned in the first accumulator assembly (108) or in the first accumulator-control valve (106). The inputs (200) include a third input signal (206). The third input signal (206) is configured to indicate a position (relative or absolute), and/or an amount of velocity of the first actuator assembly (112). A position sensor (known and not depicted) may be used to sense position of the first actuator assembly (112). A velocity sensor (known and not depicted) may be used to sense an amount of velocity of the first actuator assembly (112). The inputs (200) include a fourth input signal (208). The fourth input signal (208) is configured to provide an indication of whether the first actuator control valve (110) or whether the first accumulator-control valve (106) is in a flow position (ON or flow permitted) in a no-flow position (OFF or shut-off or flow not permitted). Status switches (known and not depicted) are associated with the first actuator control valve (110) and the first accumulator-control valve (106). Pressure transducers (known and not depicted) may be operatively mounted to the first accumulator assembly (108) and to the first actuator assembly (112) and are configured to measure hydraulic pressure, which then the molding-system controller (114) may then use for processing purposes if so required.

The molding-system controller (114) is configured to provide outputs (220). The outputs (220) are configured to provide control signals or command signals to the first actuator control valve (110) and to the first accumulator-control valve (106), and to the first pump assembly (104), and to the first motor assembly (105). The molding-system controller (114) including (and is not limited to) interface circuits configured to provide the outputs (220) for use by external devices, assemblies, etc. The outputs (220) include a first output signal (222). The first output signal (222) is configured to control operation of the first pump assembly (104). The outputs (220) include a second output signal (224). The second output signal (224) is configured to control operation of the first actuator control valve (110). The outputs (220) include a third output signal (226). The third output signal (226) is configured to control operation of the first accumulator-control valve (106). What is not depicted is expressed interface to the first motor assembly (105). It is understood that the molding-system controller (114) may be interfaced so as to control operation of the first motor assembly (105).

It will be appreciated that the molding-system controller (114) may including (and is not limited to) a single stand-alone controller, or the molding-system controller (114) may include a collection of distributed controllers that cooperate with each other. For example, the molding-system controller (114) may include a first control unit that is configured to control the first pump assembly (104), and a second control unit that is configured to control the first actuator control valve (110), and a third control unit configured to control the first accumulator-control valve (106).

Figure 2A:
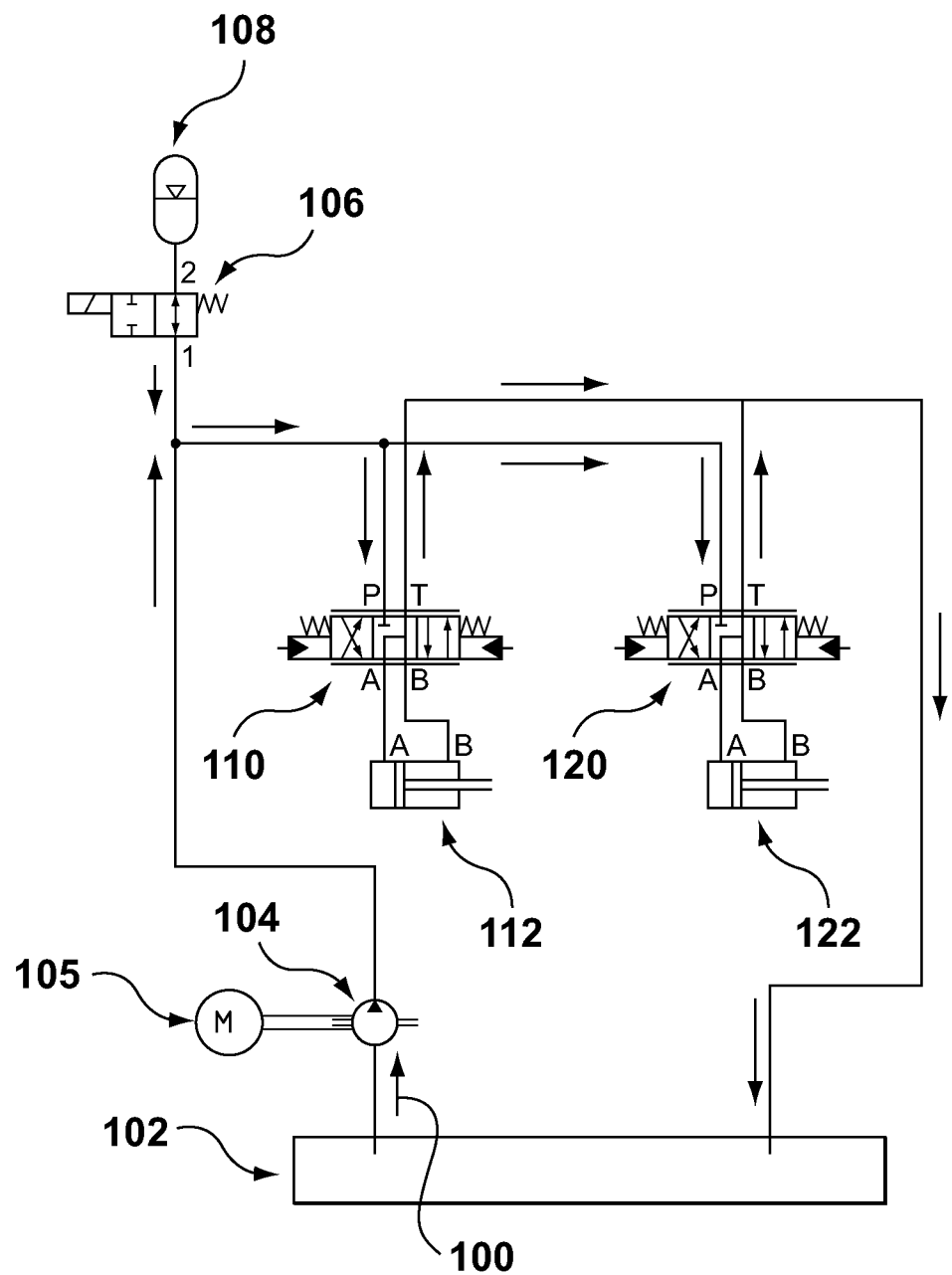
FIG. 2A depicts a second example of the first hydraulic circuit (100) of FIGS. 1A, 1B.

Referring now to FIG. 2A, there is depicts the second example of the first hydraulic circuit (100) of FIGS. 1A, 1B. The second example of the first hydraulic circuit (100) is similar to the first example of the first hydraulic circuit (100) except for the addition of a second actuator control valve (120) and a second actuator assembly (122). According to the example depicted in FIG. 2A, the hydraulic circuit further including (and is not limited to): (a) a second actuator control valve (120), and (b) a second actuator assembly (122). The second actuator control valve (120) is configured to operate in a similar fashion as the first actuator control valve (110). According to an option, the second actuator control valve (120) is not configured to operate in a similar fashion as the first actuator control valve (110). The second actuator assembly (122) is configured to operate in a similar fashion as the first actuator assembly (112). According to an option, the second actuator assembly (122) is not configured to operate in a similar fashion as the first actuator assembly (112). According to the second example, the molding-system controller (114) is configured to control operation of the second actuator assembly (122) in a similar fashion as the first actuator assembly (112). According to an option, the molding-system controller (114) is not configured to control operation of the second actuator assembly (122) in a similar fashion as the first actuator assembly (112). It will be appreciated that the first actuator assembly (112) and the second actuator assembly (122) may be operating (active) at the same time or one may operate while the other is not operating. FIG. 2A depicts both operating at the same time by way of example only.

Figure 2B:
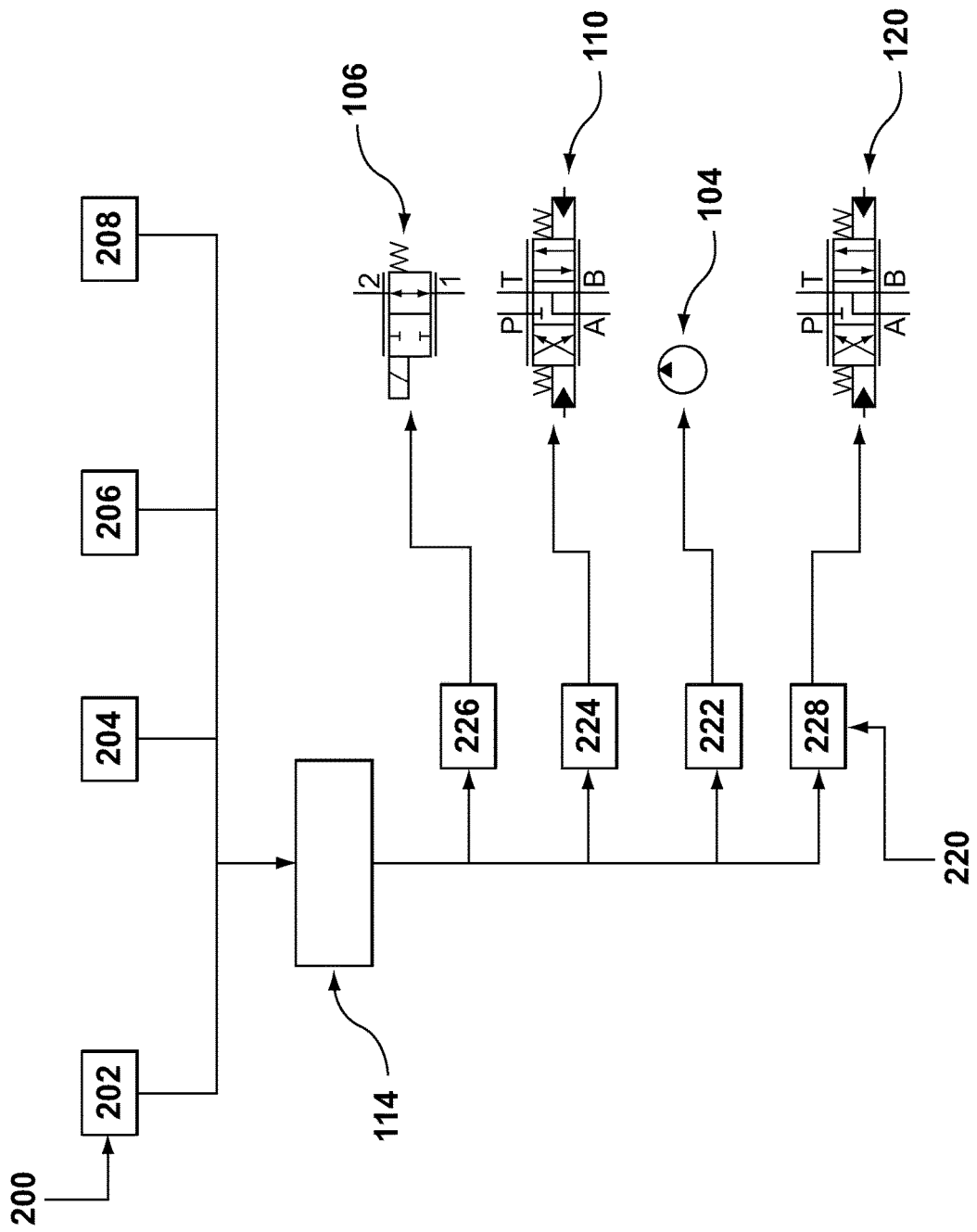
FIG. 2B depicts the second example of the molding-system controller (114) used for controlling operation of the first hydraulic circuit (100) of FIG. 2A.

Referring now to FIG. 2B, there is depicted the second example of the molding-system controller (114) used for controlling operation of the first hydraulic circuit (100) of FIG. 2A. The second example of the molding-system controller (114) is similar to the example depicted in FIG. 1D, except for the addition of a fourth output signal (228). According to the example depicted in FIG. 2B, the molding-system controller (114) is adapted so that the outputs (220) further include a fourth output signal (228). The outputs (220) include a fourth output signal (228). The fourth output signal (228) is configured to control operation of the second actuator control valve (120).

Referring now to FIG. 3A, there is depicted the third example of the first hydraulic circuit (100) of FIGS. 1A, 1B. The molding system (900) further including (and is not limited to) a second hydraulic circuit (300). According to the example depicted in FIG. 3A, and by way of example, the first actuator control valve (110) including (and is not limited to): a mold-stroke actuator control valve (310), an ejector actuator control valve (312), a clamp-up actuator control valve (314), an injection actuator control valve (316), and a transfer actuator control valve (318). According to the example depicted in FIG. 3A, the molding system (900) including (and is not limited to): the first hydraulic circuit (100); the second hydraulic circuit (300). The first hydraulic circuit (100) including (and is not limited to) the mold-stroke actuator control valve (310), the ejector actuator control valve (312), and the clamp-up actuator control valve (314). The second hydraulic circuit (300) including (and is not limited to) the injection actuator control valve (316), and the transfer actuator control valve (318). According to the example depicted in FIG. 3A, the second hydraulic circuit (300) including (and is not limited to): a second pump assembly (304), a second motor assembly (305), a second accumulator-control valve (306), and a second accumulator assembly (308). The second pump assembly (304) is similar to the first pump assembly (104). According to an option, the second pump assembly (304) is not similar to the first pump assembly (104). The second motor assembly (305) is similar to the first motor assembly (105). According to an option, the second motor assembly (305) is not similar to the first motor assembly (105). The second accumulator-control valve (306) is similar to the first accumulator-control valve (106). According to an option, the second accumulator-control valve (306) is not similar to the first accumulator-control valve (106). The second accumulator assembly (308) is similar to the first accumulator assembly (108).

According to an option, the second accumulator assembly (308) is not similar to the first accumulator assembly (108). The second accumulator assembly (308) including (and is not limited to): the auxiliary accumulator assembly (307), and the primary accumulator assembly (309). The primary accumulator assembly (309) is configured to provide a primary source of flow of hydraulic fluid. The auxiliary accumulator assembly (307) is configured to provide additional (or back-up) hydraulic fluid for the case where the primary accumulator assembly (309) cannot provide a sufficient amount of flow of hydraulic fluid. The mold-stroke actuator control valve (310) is configured to control the flow of hydraulic fluid to and from a mold-stroke actuator (320). The mold-stroke actuator control valve (310) is a known device and is not described here in any detail. The ejector actuator control valve (312) is configured to control the flow of hydraulic fluid to and from an ejector actuator (322). The ejector actuator control valve (312) is a known device and is not described here in any detail. The clamp-up actuator control valve (314) is configured to control the flow of hydraulic fluid to and from a clamp-up actuator (324). The clamp-up actuator control valve (314) is a known device and is not described here in any detail. The injection actuator control valve (316) is configured to control the flow of hydraulic fluid to and from an ejector actuator (322). The injection actuator control valve (316) is a known device and is not described here in any detail. The transfer actuator control valve (318) is configured to control the flow of hydraulic fluid to and from an ejector actuator (322). The transfer actuator control valve (318) is a known device and is not described here in any detail. The mold-stroke actuator (320) is configured to move the movable platen (908), which is depicted in FIG. 4, of the molding system (900), so that the mold assembly (918) may be moved. The mold-stroke actuator (320) is a known device and is not described here in any detail. The ejector actuator (322) is configured to move ejector rods that urge molded articles to move out from the mold assembly (918) of FIG. 4. The ejector actuator (322) is a known device and is not described here in any detail. The clamp-up actuator (324) is configured to apply a clamping force to the rod assembly (910) of FIG. 4. The clamp-up actuator (324) is a known device and is not described here in any detail. The injection actuator (326) is configured to apply an injection force to the extruder assembly (902) of FIG. 4. The injection actuator (326) is a known device and is not described here in any detail. The transfer actuator (328A) is configured to move the extruder assembly (902) of the molding system (900). The transfer actuator (328B) is configured to move the extruder assembly (902) of the molding system (900). It will be appreciated that the transfer actuator (328A) and the transfer actuator (328B) are required on a two-stage type of molding system (not depicted but known).

The molding system (900) further including (and is not limited to): a second hydraulic circuit (300), including (and is not limited to): (a) a second pump assembly (304), (b) a second accumulator-control valve (306), (c) a second accumulator assembly (308), and (d) a second motor assembly (305). The second pump assembly (304) is operatively connected to the reservoir (102). The second pump assembly (304) is operatively connected to the second motor assembly (305). The second accumulator-control valve (306) is operatively connected to the second pump assembly (304).

A mold-stroke actuator control valve (310) is operatively connected to the first pump assembly (104). An ejector actuator control valve (312) operatively connected to the first pump assembly (104). A clamp-up actuator control valve (314) operatively connected to the first pump assembly (104). An injection actuator control valve (316) operatively connected to the second pump assembly (304). A transfer actuator control valve (318) operatively connected to the second pump assembly (304).

The second accumulator assembly (308) is operatively connected to: the injection actuator control valve (316) and to the transfer actuator control valve (318). A mold-stroke actuator (320) configured to move a movable platen (908) of the molding system (900). An ejector actuator (322) configured to move ejector rods that urge molded articles to move out from a mold assembly (918) of the molding system (900). A clamp-up actuator (324) configured to apply a clamping force to rod assembly (910) of the molding system (900). An injection actuator (326A) configured to apply an injection force to an extruder assembly (902) of the molding system (900). A first transfer actuator (328A) and a second transfer actuator (328B) configured to move the extruder assembly (902) of the molding system (900).

The molding-system controller (114) is operatively connected to the second accumulator-control valve (306), the mold-stroke actuator control valve (310), the ejector actuator control valve (312) the clamp-up actuator control valve (314), the injection actuator control valve (316) and, the transfer actuator control valve (318). The molding-system controller (114) is configured to send a command signal to the second accumulator-control valve (306), the mold-stroke actuator control valve (310), the ejector actuator control valve (312) the clamp-up actuator control valve (314), the injection actuator control valve (316) and, the transfer actuator control valve (318).

According to an option, the command signal is configured to request: (i) the first accumulator-control valve (106) to permit flow of hydraulic fluid from the first accumulator assembly (108) to any one of the mold-stroke actuator control valve (310), the ejector actuator control valve (312), and the clamp-up actuator control valve (314), and (ii) any one of the mold-stroke actuator control valve (310), the ejector actuator control valve (312), and the clamp-up actuator control valve (314) to permit flow of hydraulic fluid from the first pump assembly (104) to any one of the mold-stroke actuator (320), the ejector actuator (322), the clamp-up actuator (324), for the case where the molding-system controller (114) determines that any one of the mold-stroke actuator (320), the ejector actuator (322) and the clamp-up actuator (324) requires the flow from both the first pump assembly (104) and the first accumulator assembly (108) during a portion of a molding cycle of the molding system (900).

According to another option, the command signal is configured to request: (i) the second accumulator-control valve (306) to permit flow of hydraulic fluid from the second accumulator assembly (308) to any one of the injection actuator (326), the transfer actuator (328A) and the transfer actuator (328B), and (ii) any one of the injection actuator control valve (316) and the transfer actuator control valve (318) to permit flow of hydraulic fluid from the second pump assembly (304) to any one of the injection actuator (326), the transfer actuator (328A) and the transfer actuator (328B), for the case where the molding-system controller (114) determines that any one of the injection actuator (326), the transfer actuator (328A) and the transfer actuator (328B) requires the flow from both the second pump assembly (304) and the second accumulator assembly (308) during a portion of a molding cycle of the molding system (900).

Figure 3B:
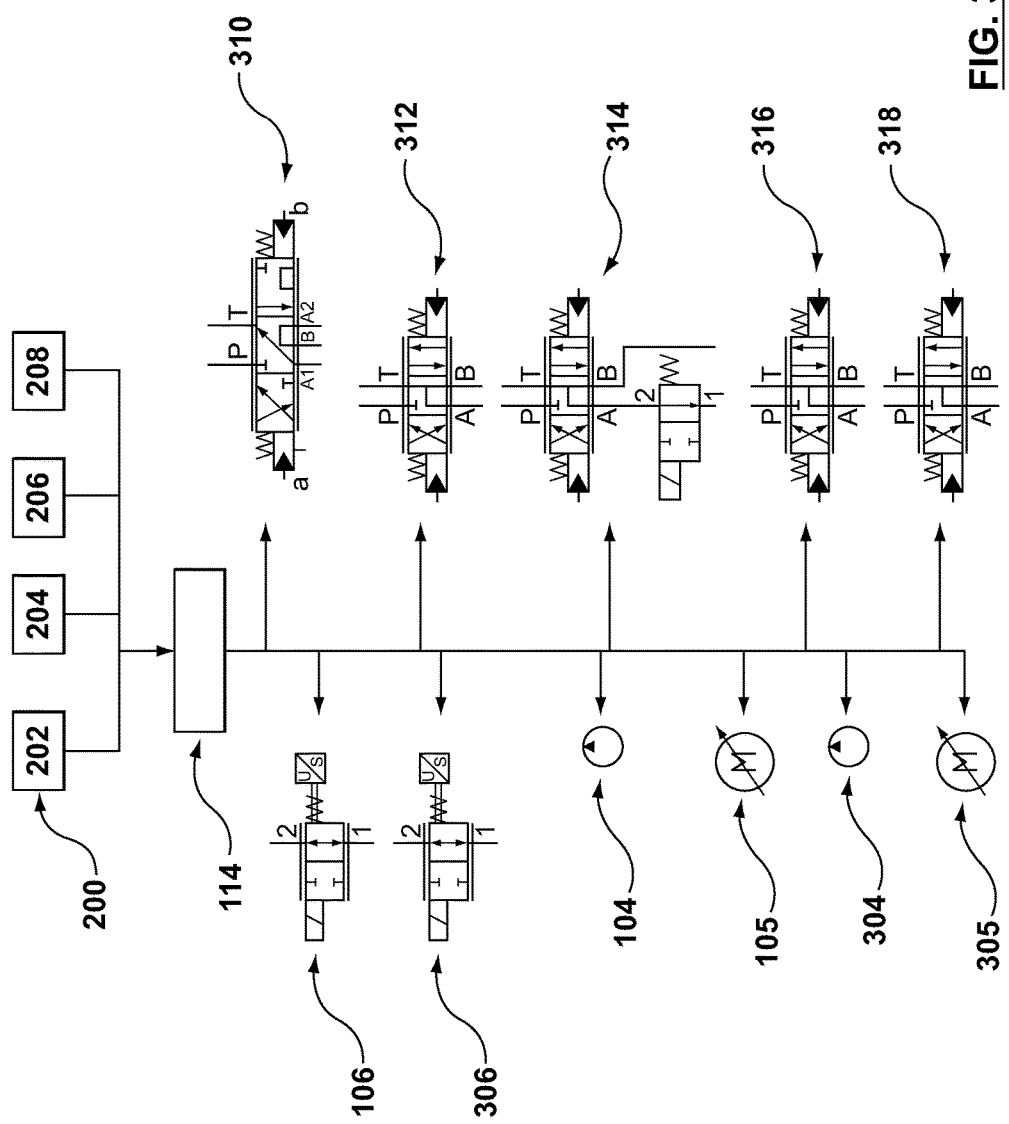
FIG. 3B depicts the third example of the molding-system controller (114) used for controlling operation of the first hydraulic circuit (100) and of the second hydraulic circuit (300) of FIG. 3A.

Referring now to FIG. 3B, there is depicted the third example of the molding-system controller (114) used for controlling operation of the first hydraulic circuit (100) and of the second hydraulic circuit (300) of FIG. 3A. According to the example depicted in FIG. 3B, the outputs (220) of the molding-system controller (114) are configured to control operation of: the mold-stroke actuator control valve (310), the ejector actuator control valve (312), the clamp-up actuator control valve (314), the injection actuator control valve (316), and the transfer actuator control valve (318). According to the example depicted in FIG. 3B, the outputs (220) of the molding-system controller (114) are configured to control operation of: the first accumulator-control valve (106), the second accumulator-control valve (306), the first pump assembly (104), the first motor assembly (105), the second pump assembly (304), and the second motor assembly (305).

Referring now to FIG. 4, there is depicted the example of the molding system (900) configured to support and to use the first hydraulic circuit (100) of any one of FIGS. 1A, 1B, 2A, 3A, and/or the second hydraulic circuit (302) of FIG. 3A. According to the example depicted in FIG. 4, there is depicted the molding system (900). The molding system (900) and the runner system (916) may include components that are known to persons skilled in the art, and these known components may not be described here; these known components are described, at least in part, in the following reference books (for example): (i) "Injection Molding Handbook" authored by OSSWALD/TURNG/GRAMANN (ISBN: 3-446-21669-2), (ii) "Injection Molding Handbook" authored by ROSATO AND ROSATO (ISBN: 0-412-99381-3), (iii) "Injection Molding Systems" 3rd Edition authored by JOHANNABER (ISBN 3-446-17733-7) and/or (iv) "Runner and Gating Design Handbook" authored by BEAUMONT (ISBN 1-446-22672-9).

It will be appreciated that the memory assembly (800) and the molding system (900) may be sold separately or may be sold combined. That is, one vendor may provide the memory assembly (800) while another vendor provides the molding system (900).

More specifically, FIG. 4 depicts an example of a schematic representation of the molding system (900). The molding system (900) may also be called an injection-molding system for example. According to the example depicted in FIG. 1, the molding system (900) includes (and is not limited to): (i) an extruder assembly (902), (ii) a clamp assembly (904), (iii) a runner system (916), and/or (iv) a mold assembly (918). By way of example, the extruder assembly (902) is configured, to prepare, in use, a heated, flowable resin, and is also configured to inject or to move the resin from the extruder assembly (902) toward the runner system (916). Other names for the extruder assembly (902) may include injection unit, melt-preparation assembly, etc. By way of example, the clamp assembly (904) includes (and is not limited to): (i) a stationary platen (906), (ii) a movable platen (908), (iii) a rod assembly (910), (iv) a clamping assembly (912), and/or (v) a lock assembly (914). The stationary platen (906) does not move; that is, the stationary platen (906) may be fixedly positioned relative to the ground or floor. The movable platen (908) is configured to be movable relative to the stationary platen (906). A platen-moving mechanism (not depicted but known) is connected to the movable platen (908), and the platen-moving mechanism is configured to move, in use, the movable platen (908). The rod assembly (910) extends between the movable platen (908) and the stationary platen (906). The rod assembly (910) may have, by way of example, four rod structures positioned at the corners of the respective stationary platen (906) and the movable platen (908). The rod assembly (910) is configured to guide movement of the movable platen (908) relative to the stationary platen (906). A clamping assembly (912) is connected to the rod assembly (910). The stationary platen (906) is configured to support (or configured to position) the position of the clamping assembly (912). The lock assembly (914) is connected to the rod assembly (910), or may alternatively be connected to the movable platen (908). The lock assembly (914) is configured to selectively lock and unlock the rod assembly (910) relative to the movable platen (908). By way of example, the runner system (916) is attached to, or is supported by, the stationary platen (906). The runner system (916) is configured to receive the resin from the extruder assembly (902). By way of example, the mold assembly (918) includes (and is not limited to): (i) a mold-cavity assembly (920), and (ii) a mold-core assembly (922) that is movable relative to the mold-cavity assembly (920). The mold-core assembly (922) is attached to or supported by the movable platen (908). The mold-cavity assembly (920) is attached to or supported by the runner system (916), so that the mold-core assembly (922) faces the mold-cavity assembly (920). The runner system (916) is configured to distribute the resin from the extruder assembly (902) to the mold assembly (918).

In operation, the movable platen (908) is moved toward the stationary platen (906) so that the mold-cavity assembly (920) is closed against the mold-core assembly (922), so that the mold assembly (918) may define a mold cavity configured to receive the resin from the runner system (916). The lock assembly (914) is engaged so as to lock the position of the movable platen (908) so that the movable platen (908) no longer moves relative to the stationary platen (906). The clamping assembly (912) is then engaged to apply a camping pressure, in use, to the rod assembly (910), so that the clamping pressure then may be transferred to the mold assembly (918). The extruder assembly (902) pushes or injects, in use, the resin to the runner system (916), which then the runner system (916) distributes the resin to the mold cavity structure defined by the mold assembly (918). Once the resin in the mold assembly (918) is solidified, the clamping assembly (912) is deactivated so as to remove the clamping force from the mold assembly (918), and then the lock assembly (914) is deactivated to permit movement of the movable platen (908) away from the stationary platen (906), and then a molded article may be removed from the mold assembly (918).

It will be appreciated that the molding system (900) may include more than two platens. According to an example, the molding system (900) includes (and is not limited to): a third platen (not depicted), which is also called a clamping platen that is known in the art and thus is not described here in greater detail.

Figure 5:
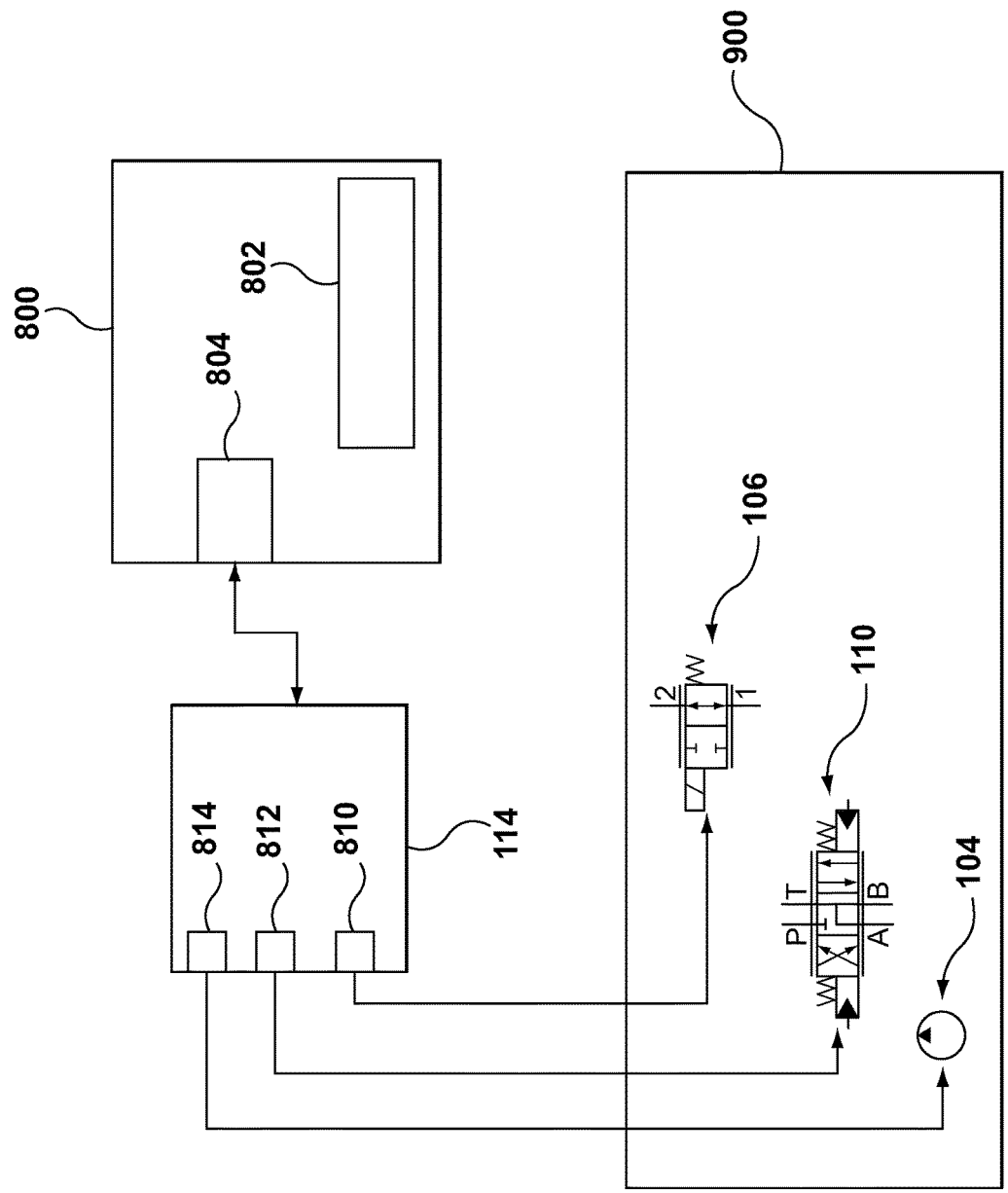
FIG. 5 depicts an example of a memory assembly (800) use by the molding-system controller (114) of any one of FIGS. 1D, 2B, 3B.

Referring now to FIG. 5, there is depicted the example of a memory assembly (800) use by the molding-system controller (114) of any one of FIGS. 1D, 2B, 3B. The memory assembly (800) refers to devices and their interfaces used to store controller-executable programs (that is, sequences of instructions) or data (e.g. program state information) on a temporary or permanent basis for use by the molding-system controller (114). The molding-system controller (114) may be a computer system or other digital electronic device. The molding-system controller (114) may be an analogue controller or may be a digital controller.

There is provided an option, from amongst others options, that provides a solution to the problem, which is a memory assembly (800), which is a memory assembly (800). According to the example depicted in FIG. 5, the memory assembly (800) including (and is not limited to) a storage media (802). The storage media (802) may include devices such as (by way of example): Random Access memory (RAM), or an optical disc or a hard disc, or other memory-storage device such as tape, magnetic disks or optical discs such as Compact Disc Read only memory (CD-ROM), etc, or addressable semiconductor memory (i.e. integrated circuits) including (and is not limited to) silicon-based transistors. The memory assembly (800) may be volatile memory or non-volatile memory. The storage media (802) tangibly embodies executable commands configured to direct a molding-system controller (114) to send a command signal to the first accumulator-control valve (106) and the first actuator control valve (110). Therefore, in accordance with this option, it will be appreciated that the molding-system controller (114) is sold separately from the memory assembly (800).

The command signal is configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112) for the case where the molding-system controller (114) determines that the first actuator assembly (112) requires the flow from both the first pump assembly (104) and the first accumulator assembly (108) during a portion of a molding cycle of the molding system (900).

memory-interface assembly (804) The memory assembly (800) further including (and is not limited to) a memory-interface assembly (804) configured to interface with a molding-system controller (114) having: (a) a first controller output (810) configured to operatively connect to a first accumulator-control valve (106), (b) a second controller output (812) configured to operatively connect to a first actuator control valve (110), and (c) a third controller output (814) configured to operatively connect to a first pump assembly (104).

The memory-interface assembly (804) is a communication interface between the memory assembly (800) and the molding-system controller (114). The memory-interface assembly (804) is configured to allow an amount of data transfer permitted over time such as a clock cycle of the memory assembly (800).

According to an option, the memory assembly (800) further including (and is not limited to) the molding-system controller (114) operatively connected to the memory-interface assembly (804). For example, an interface cable or other suitable wiring may operatively connect the molding-system controller (114) with the memory-interface assembly (804).

In accordance with the following option, the molding-system controller (114) and the memory assembly (800) are integrated together. Specifically, the memory assembly (800) further including (and is not limited to): (i) the molding-system controller (114) operatively connected to the memory-interface assembly (804), and (ii) the molding system (900) having the first accumulator-control valve (106) operatively connected to the molding-system controller (114), and also having the first actuator control valve (110) operatively connected to the molding-system controller (114). For example, an interface cable or other suitable wiring may operatively connect the molding-system controller (114) with the first accumulator-control valve (106) and the first actuator control valve (110).

According to another option, there is provided, from amongst others options, a solution to the problem, which is a molding-system controller (114). The molding-system controller (114) including (and is not limited to): (a) a first controller output (810), (b) a second controller output (812), (c) a third controller output (814), and (d) a memory assembly (800). The first controller output (810) is configured to operatively connect to a first accumulator-control valve (106). The second controller output (812) is configured to operatively connect to a first actuator control valve (110). The third controller output (814) is configured to operatively connect to a first pump assembly (104). The memory assembly (800) has executable command configured to direct the molding-system controller (114) to send a command signal to the first accumulator-control valve (106) and the first actuator control valve (110). The command signal is configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112), for the case where the molding-system controller (114) determines that the first actuator assembly (112) requires the flow from both the first pump assembly (104) and the first accumulator assembly (108) during a portion of a molding cycle of the molding system (900).

According to a fourth aspect, there is provided a method of operating a molding-system controller (114). The method including (and is not limited to): configuring the molding-system controller (114) to send a command signal to the first accumulator-control valve (106) and the first actuator control valve (110), wherein the command signal is configured to request: (i) the first accumulator-control valve (106) to permit flow of hydraulic fluid from a first accumulator assembly (108) to a first actuator assembly (112), and (ii) the first actuator control valve (110) to permit flow of hydraulic fluid from a first pump assembly (104) to the first actuator assembly (112), for a case where the molding-system controller (114) determines that the first actuator assembly (112) requires the flow from both the first pump assembly (104) and the first accumulator assembly (108) during a portion of a molding cycle of the molding system (900). By way of example, the method may be implemented by the controller executable code configured to direct the molding-system controller (114) to achieve the above description.

It will be appreciated that the molding-system controller (114) may including (and is not limited to) a single stand-alone controller, or the molding-system controller (114) may include a collection of distributed controllers that cooperate with each other. For example, the molding-system controller (114) may include a first control unit that is configured to control the first pump assembly (104), and a second control unit that is configured to control the first actuator control valve (110), and a third control unit configured to control the first accumulator-control valve (106).

Generally speaking, the molding-system controller (114) including (and is not limited to) controller-executable instructions configured to operate the first accumulator assembly (108) in accordance with the description provided above. The molding-system controller (114) may use computer software, or just software, which is a collection of computer programs (controller-executable instructions) and related data that provide the instructions for instructing the molding-system controller (114) what to do and how to do it. In other words, software is a conceptual entity that is a set of computer programs, procedures, and associated documentation concerned with the operation of a controller assembly, also called a data-processing system. Software refers to one or more computer programs and data held in a storage assembly (a memory module) of the controller assembly for some purposes. In other words, software is a set of programs, procedures, algorithms and its documentation. Program software performs the function of the program it implements, either by directly providing instructions to computer hardware or by serving as input to another piece of software. In computing, an executable file (executable instructions) causes the molding-system controller (114) to perform indicated tasks according to encoded instructions, as opposed to a data file that must be parsed by a program to be meaningful. These instructions are machine-code instructions for a physical central processing unit. However, in a more general sense, a file containing instructions (such as bytecode) for a software interpreter may also be considered executable; even a scripting language source file may therefore be considered executable in this sense. While an executable file can be hand-coded in machine language, it is far more usual to develop software as source code in a high-level language understood by humans, or in some cases, an assembly language more complex for humans but more closely associated with machine code instructions. The high-level language is compiled into either an executable machine code file or a non-executable machine-code object file; the equivalent process on assembly language source code is called assembly.

Several object files are linked to create the executable. The same source code can be compiled to run under different operating systems, usually with minor operating-system-dependent features inserted in the source code to modify compilation according to the target. Conversion of existing source code for a different platform is called porting. Assembly-language source code and executable programs are not transportable in this way. An executable comprises machine code for a particular processor or family of processors. Machine-code instructions for different processors are completely different and executables are totally incompatible. Some dependence on the particular hardware, such as a particular graphics card may be coded into the executable. It is usual as far as possible to remove such dependencies from executable programs designed to run on a variety of different hardware, instead installing hardware-dependent device drivers on the molding-system controller (114), which the program interacts with in a standardized way. Some operating systems designate executable files by filename extension (such as .exe) or noted alongside the file in its metadata (such as by marking an execute permission in Unix-like operating systems). Most also check that the file has a valid executable file format to safeguard against random bit sequences inadvertently being run as instructions. Modern operating systems retain control over the resources of the molding-system controller (114), requiring that individual programs make system calls to access privileged resources. Since each operating system family features its own system call architecture, executable files are generally tied to specific operating systems, or families of operating systems. There are many tools available that make executable files made for one operating system work on another one by implementing a similar or compatible application binary interface. When the binary interface of the hardware the executable was compiled for differs from the binary interface on which the executable is run, the program that does this translation is called an emulator. Different files that can execute but do not necessarily conform to a specific hardware binary interface, or instruction set, can be represented either in bytecode for Just-in-time compilation, or in source code for use in a scripting language.

According to another option, the molding-system controller (114) including (and is not limited to) application-specific integrated circuits configured to operate the first accumulator assembly (108) in accordance with the description provided above. It may be appreciated that an alternative to using software (controller-executable instructions) in the molding-system controller (114) is to use an application-specific integrated circuit (ASIC), which is an integrated circuit (IC) customized for a particular use, rather than intended for general-purpose use. For example, a chip designed solely to run a cell phone is an ASIC. Some ASICs include entire 32-bit processors, memory blocks including (and is not limited to) ROM, RAM, EEPROM, Flash and other large building blocks. Such an ASIC is often termed a SoC (system-on-chip). Designers of digital ASICs use a hardware description language (HDL) to describe the functionality of ASICs. Field-programmable gate arrays (FPGA) are used for building a breadboard or prototype from standard parts; programmable logic blocks and programmable interconnects allow the same FPGA to be used in many different applications. For smaller designs and/or lower production volumes, FPGAs may be more cost effective than an ASIC design. A field-programmable gate array (FPGA) is an integrated circuit designed to be configured by the customer or designer after manufacturing—hence field-programmable. The FPGA configuration is generally specified using a hardware description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could perform. The ability to update the functionality after shipping, partial re-configuration of the portion of the design and the low non-recurring engineering costs relative to an ASIC design offer advantages for many applications. FPGAs contain programmable logic components called logic blocks, and a hierarchy of reconfigurable interconnects that allow the blocks to be wired together—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or more complete blocks of memory. In addition to digital functions, some FPGAs have analog features. The most common analog feature is programmable slew rate and drive strength on each output pin, allowing the engineer to set slow rates on lightly loaded pins that would otherwise ring unacceptably, and to set stronger, faster rates on heavily loaded pins on high-speed channels that would otherwise run too slow. Another relatively common analog feature is differential comparators on input pins designed to be connected to differential signaling channels. A few "mixed signal FPGAs" have integrated peripheral Analog-to-Digital Converters (ADCs) and Digital-to-Analog Converters (DACs) with analog signal conditioning blocks allowing them to operate as a system-on-a-chip. Such devices blur the line between an FPGA, which carries digital ones and zeros on its internal programmable interconnect fabric, and field-programmable analog array (FPAA), which carries analog values on its internal programmable interconnect fabric.

It may be appreciated that for the purposes of this document, the phrase "includes (and is not limited to)" is equivalent to the word "comprising." The word "comprising" is a transitional phrase or word that links the preamble of a patent claims to the specific elements set forth in the claims that define what the invention itself actually is. The transitional phrase acts as a limitation on the claim, indicating whether a similar device, method, or composition infringes the patent if the accused device (etc) contains more or fewer elements than the claim in the patent. The word "comprising" is to be treated as an open transition, which is the broadest form of transition, as it does not limit the preamble to whatever elements are identified in the claim. As well, "an assembly" is functionally equivalent to "at least one assembly." "An assembly" is not limited to one and only one assembly. It is understood that "an assembly" and "at least one assembly" means that there is one or more instances of the assembly. It is understood that "an assembly, system, component, or entity, etc" is functionally equivalent to "at least one or more assemblies, systems, components, or entities."

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the inventions and/or examples of the invention that is superior to others, so long as the functions may be performed. It is believed that all the crucial aspects of the invention have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes (and is not limited to)" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. A memory assembly, comprising:
   a storage media tangibly embodying executable commands configured to direct a molding-system controller to send a command signal to a first accumulator-control valve and to a first actuator control valve,
   the command signal configured to request:
      where the molding-system controller determines that the hydraulic fluid flow requirements of a first actuator assembly are within the capacity of a first pump assembly;
      (i) the first actuator control valve to permit flow of hydraulic fluid from the first pump assembly; and
      (ii) the first accumulator-control valve to prevent flow of hydraulic fluid from a first accumulator assembly; and
   where the molding-system controller determines that a first actuator assembly requires flow of hydraulic fluid from both the first pump assembly and the first accumulator assembly during a portion of a molding cycle:
      (i) the first accumulator-control valve to permit flow of hydraulic fluid from a first accumulator assembly to a first actuator assembly, and
      (ii) the first actuator control valve to permit flow of hydraulic fluid from a first pump assembly to the first actuator assembly, and
   a molding system having:
      the first accumulator-control valve operatively connected to the molding-system controller, and
      the first actuator control valve operatively connected to the molding-system controller and operatively connected to a reservoir for pumping hydraulic fluid to the first accumulator-control valve and to the first actuator-control valve.

2. The memory assembly of claim 1, further comprising:
   a memory-interface assembly configured to interface with the molding-system controller, the molding-system controller having:
      a first controller output configured to operatively connect to the first accumulator-control valve,
      a second controller output configured to operatively connect to the first actuator control valve, and
      a third controller output configured to operatively connect to the first pump assembly.

3. The memory assembly of claim 2, wherein:
   the molding-system controller is operatively connected to the memory-interface assembly.

4. The memory assembly of claim 1, wherein:
   the molding-system controller is configured to vary hydraulic pressure in the first accumulator assembly during or within the molding cycle for the case where the first actuator assembly is not operating, then the first accumulator assembly is recharged.

5. The memory assembly of claim 1, wherein:
   the molding system includes:
      a first hydraulic circuit, includes:
         the reservoir,
         the first pump assembly,
         the first accumulator-control valve,
         the first accumulator assembly,
         the first actuator control valve, and
         the first actuator assembly,
         the first pump assembly is operatively connected to the reservoir, the first accumulator-control valve is operatively connected to the first pump assembly, the first accumulator assembly is operatively connected to the first accumulator-control valve, the first actuator control valve is operatively connected to the first pump assembly, and the first actuator assembly is operatively connected to the first actuator control valve.

6. The memory assembly of claim 5, wherein:
   the molding-system controller is configured to receive inputs), the inputs include:
      a first input signal configured to indicate an amount of hydraulic flow from the first pump assembly,
      a second input signal is configured to indicate an amount of pressure in the first accumulator assembly, and is configured to indicate the amount of pressure in the first actuator control valve,
      a third input signal configured to indicate any one of a position an amount of velocity of the first actuator assembly, and a fourth input signal configured to provide an indication of whether the first actuator control valve and whether the first accumulator-control valve is in a flow position or in a no-flow position.

7. The memory assembly of claim 6, wherein:
the molding-system controller is configured to provide outputs, the outputs configured to provide command signals to the first actuator control valve (110) and to the first accumulator-control valve, the outputs include:
   a first output signal configured to control operation of the first pump assembly,
   a second output signal configured to control operation of the first actuator control valve, and
   a third output signal configured to control operation of the first accumulator-control valve.

8. The memory assembly of claim 7, wherein:
the first hydraulic circuit includes: a second actuator control valve, and a second actuator assembly,
the molding-system controller is configured to control operation of the second actuator assembly, and
the outputs further include a fourth output signal configured to control operation of the second actuator control valve.

9. The memory assembly of claim 5, wherein:
the molding system further includes:
   a second hydraulic circuit, including:
      a second pump assembly,
      a second accumulator-control valve, and
      a second accumulator assembly, and (d) a second motor assembly,
      the second pump assembly is operatively connected to the reservoir,
      the second pump assembly is operatively connected to the second motor assembly,
      the second accumulator-control valve is operatively connected to the second pump assembly,
      a mold-stroke actuator control valve is operatively connected to the first pump assembly,
      an ejector actuator control valve operatively connected to the first pump assembly,
      a clamp-up actuator control operatively connected to the first pump assembly,
      an injection actuator control valve operatively connected to the second pump assembly, and
      a transfer actuator control valve operatively connected to the second pump assembly,
      the second accumulator assembly operatively connected to the injection actuator control valve and to the transfer actuator control valve,
      a mold-stroke actuator configured to move a movable platen of the molding system,
      an ejector actuator configured to move ejector rods that urge molded articles to move out from a mold assembly of the molding system,
      a clamp-up actuator configured to apply a clamping force to rod assembly of the molding system,
      an injection actuator configured to apply an injection force to an extruder assembly of the molding system,
      a first transfer actuator and a second transfer actuator configured to move the extruder assembly of the molding system,
the molding-system controller is operatively connected to the second accumulator-control valve, the mold-stroke actuator control valve, the ejector actuator control valve the clamp-up actuator control valve, the injection actuator control valve and, the transfer actuator control valve,
the molding-system controller is configured to send the command signal to the second accumulator-control valve, the mold-stroke actuator control valve, the ejector actuator control valve the clamp-up actuator control valve, the injection actuator control valve and, the transfer actuator control valve,
the command signal is configured to request: (i) the first accumulator-control valve to permit flow of hydraulic fluid from the first accumulator assembly to any one of the mold-stroke actuator control valve, the ejector actuator control valve, and the clamp-up actuator control valve, and (ii) any one of the mold-stroke actuator control valve, the ejector actuator control valve, and the clamp-up actuator control valve to permit the flow of hydraulic fluid from the first pump assembly to any one of the mold-stroke actuator, the ejector actuator, the clamp-up actuator, for the case where the molding-system controller determines that any one of the mold-stroke actuator, the ejector actuator and the clamp-up actuator requires flow of hydraulic fluid from both the first pump assembly and the first accumulator assembly during the portion of the molding cycle of the molding system, and
the command signal is configured to request: (i) the second accumulator-control valve to permit the flow of hydraulic fluid from the second accumulator assembly to any one of the injection actuator, the transfer actuator and the transfer actuator, and (ii) any one of the injection actuator control valve and the transfer actuator control valve to permit the flow of hydraulic fluid from the second pump assembly to any one of the injection actuator, the transfer actuator and the transfer actuator, for the case where the molding-system controller determines that any one of the injection actuator, the transfer actuator and the transfer actuator requires the flow from both the second pump assembly and the second accumulator assembly during the portion of the molding cycle of the molding system.

\* \* \* \* \*

(12) EX PARTE REEXAMINATION CERTIFICATE (204th)
Ex Parte Reexamination Ordered under 35 U.S.C. 257

United States Patent
Schultz

(10) Number: US 10,059,048 C1
(45) Certificate Issued: Jan. 14, 2022

(54) FLOW OF HYDRAULIC FLUID FROM ACCUMULATOR ASSEMBLY AND FROM PUMP ASSEMBLY TO ACTUATOR WHERE HIGHER FLOW IS REQUIRED

(71) Applicant: Husky Injection Molding Systems Ltd., Bolton (CA)

(72) Inventor: Gregory Allan Schultz, Bolton (CA)

(73) Assignee: HUSKY INJECTION MOLDING SYSTEMS LTD., Bolton (CA)

Supplemental Examination Request:
No. 96/000,344, Oct. 15, 2020

Reexamination Certificate for:
Patent No.: 10,059,048
Issued: Aug. 28, 2018
Appl. No.: 14/371,611
PCT Filed: Feb. 6, 2013
PCT No.: PCT/CA2013/050089
§ 371 (c)(1),
(2) Date: Jul. 10, 2014
PCT Pub. No.: WO2013/120194
PCT Pub. Date: Aug. 22, 2013

Related U.S. Application Data

(60) Provisional application No. 61/598,030, filed on Feb. 13, 2012, provisional application No. 60/163,846, filed on Nov. 5, 1999.

(51) Int. Cl.
*B29C 45/82* (2006.01)
*B29C 45/76* (2006.01)

(52) U.S. Cl.
CPC ............. *B29C 45/82* (2013.01); *B29C 45/76* (2013.01); *B29C 45/7626* (2013.01); *B29C 45/7653* (2013.01); *B29C 2045/824* (2013.01); *B29C 2945/76859* (2013.01); *B29C 2945/76869* (2013.01); *B29C 2945/76896* (2013.01)

(58) Field of Classification Search
None
See application file for complete search history.

(56) References Cited

To view the complete listing of prior art documents cited during the supplemental examination proceeding and the resulting reexamination proceeding for Control Number 96/000,344, please refer to the USPTO's public Patent Application Information Retrieval (PAIR) system under the Display References tab.

*Primary Examiner* — Leonardo Andujar

(57) ABSTRACT

A memory assembly (800), comprising: a storage media (802) tangibly embodying executable commands configured to direct a molding-system controller (114) to send a command signal to the first accumulator-control valve (106) and the first actuator control valve (110), the command signal configured to request: (i) the first accumulator-control valve (106) to permit flow of hydraulic fluid from the first accumulator assembly (108) to the first actuator assembly (112), and (ii) the first actuator control valve (110) to permit flow of hydraulic fluid from the first pump assembly (104) to the first actuator assembly (112) for the case where the molding-system controller (114) determines that the first actuator assembly (112) requires the flow from both the first pump assembly (104) and the first accumulator assembly (108) during a portion of a molding cycle.

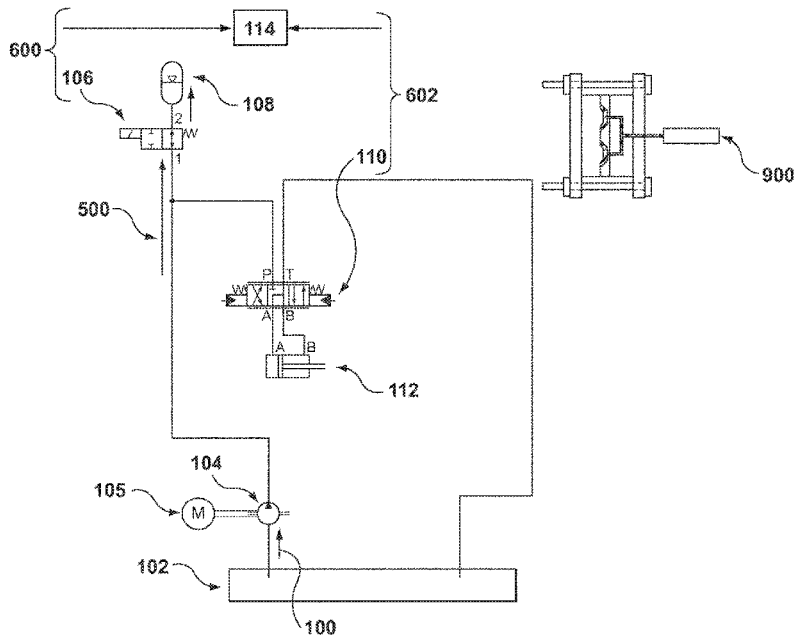

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-9, dependent on an amended claim, are determined to be patentable.

1. A memory assembly, comprising:
a storage media tangibly embodying executable commands configured to direct a molding-system controller to send a command signal to a first accumulator-control valve and to a first actuator control valve,
the command signal configured to request:
where the molding-system controller determines that the hydraulic fluid flow requirements of a first actuator assembly are within the capacity of a first pump assembly;
(i) the first actuator control valve to permit flow of hydraulic fluid from the first pump assembly *to the first actuator assembly*; and
(ii) the first accumulator-control valve to prevent flow of hydraulic fluid from a first accumulator assembly *to the first actuator assembly*; and
where the molding system controller determines that a first actuator assembly requires flow of hydraulic fluid from both the first pump assembly and the first accumulator assembly during a portion of a molding cycle:
(i) the first accumulator-control valve to permit flow of hydraulic fluid from a first accumulator assembly to a first actuator assembly, and
(ii) the first actuator control valve to permit flow of hydraulic fluid from a first pump assembly to the first actuator assembly, and
a molding system having:
the first accumulator-control valve operatively connected to the molding-system controller, and the first actuator control valve operatively connected to the molding-system controller and operatively connected to a reservoir for pumping hydraulic fluid to the first accumulator-control valve and to the first actuator-control valve.

\* \* \* \* \*